US012657620B1

(12) United States Patent
Brossman et al.

(10) Patent No.: US 12,657,620 B1
(45) Date of Patent: Jun. 16, 2026

(54) GENERATING PERSONALIZED ITEM RECOMMENDATIONS BASED ON EVENT INFORMATION

(71) Applicant: The RealReal, Inc., San Francisco, CA (US)

(72) Inventors: Christopher Brossman, San Francisco, CA (US); Anurag Syal, Fremont, CA (US)

(73) Assignee: The RealReal, Inc., San Francisco, CA (US)

( * ) Notice: Subject to any disclaimer, the term of this patent is extended or adjusted under 35 U.S.C. 154(b) by 252 days.

(21) Appl. No.: 18/384,819

(22) Filed: Oct. 27, 2023

Related U.S. Application Data

(63) Continuation-in-part of application No. 17/863,287, filed on Jul. 12, 2022.

(51) Int. Cl.
G06Q 30/00 (2023.01)
G06Q 10/087 (2023.01)
G06Q 30/0601 (2023.01)

(52) U.S. Cl.
CPC ....... G06Q 30/0631 (2013.01); G06Q 10/087 (2013.01)

(58) Field of Classification Search
CPC .................. G06Q 30/0631; G06Q 10/087
See application file for complete search history.

(56) References Cited

U.S. PATENT DOCUMENTS 11,100,560 B2 8/2021 Parker et al.
2019/0325498 A1 * 10/2019 Clark ................. G06Q 30/0643
(Continued)

FOREIGN PATENT DOCUMENTS

CN 102968555 A 3/2013
KR 20190056748 A 5/2019
(Continued)

OTHER PUBLICATIONS

A. Ravi, S. Repakula, U.K. Dutta and M. Parmar, "Buy Me That Look: An Approach for Recommending Similar Fashion Products," 2021 IEEE 4th International Conference on Multimedia Information Processing and Retrieval (MIPR), Tokyo, Japan, 2021, pp. 97-103, doi: 10.1109/MIPR51284.2021.00022. (Year: 2021).*

*Primary Examiner* — Anand Loharikar
(74) *Attorney, Agent, or Firm* — Adibi IP Group, PC; Amir V. Adibi; Andrew C. Palmer

(57) ABSTRACT

An event based personalized item generation system recommends available items in inventory to users based on upcoming events. The event based personalized item generation system includes a storage system and an event based item generator. The event based personalized item generation system receives available inventory information, user information for a user, and event information for an upcoming event, and generates a list of recommended items the system predicts will be of interest to the user attending the event. The event information is obtained from LLMs, AI models, stored data, scraping, or user input and includes event type, location, event setting, climate, local culture, and other event-related information. The user information indicates buying preferences of the user, including price range, designer or item source, taxon, color, sizing, gender, historical purchases, and other user preference information. In one embodiment, the inventory is provided by a single SKU (stock keeping unit) provider.

20 Claims, 26 Drawing Sheets

OUTFIT RECOMMENDER SYSTEM

(56)        References Cited

U.S. PATENT DOCUMENTS

| | | | |
|---|---|---|---|
| 2019/0332946 A1* | 10/2019 | Han | G06N 5/022 |
| 2020/0257976 A1 | 8/2020 | Polania Cabrera et al. | |
| 2020/0394699 A1 | 12/2020 | Mueller | |
| 2021/0166290 A1 | 6/2021 | Di et al. | |
| 2021/0182934 A1 | 6/2021 | Semarjian et al. | |

FOREIGN PATENT DOCUMENTS

| | | |
|---|---|---|
| KR | 102282738 B1 | 7/2021 |
| TW | M610867 U | 4/2021 |
| WO | 2018078352 A2 | 5/2018 |
| WO | 2021071240 A1 | 4/2021 |

* cited by examiner

OUTFIT RECOMMENDER SYSTEM

EMBEDDINGS OF PRECONFIGURED ITEMS

36

EACH IMAGE REPRESENTS AN EMBEDDING
FOR THE PRECONFIGURED ITEM

20

EMB: $[S_1, S_2,..., S_N]$
TAXON: T1
37
38

IMAGE AND
OPTIONAL
ADDITIONAL
INFO INPUT TO
EMBEDDING
MODEL

EMBEDDING
MODEL
(EX: CNN)
33

EMBEDDING MODEL
OUTPUTS LOW
DIMENSIONAL VECTOR
(E.G. EMBEDDING)

EMBEDDINGS OF ITEMS IN AVAILABLE INVENTORY

OBTAIN ITEM IN PRECONFIGURED OUTFITS MOST
VISUALLY SIMILAR TO THE SELECTED ITEM

OBTAIN ITEM IN PRECONFIGURED OUTFITS MOST
VISUALLY SIMILAR TO THE SELECTED ITEM

52

$$similarity = \cos(\theta) = \frac{A \cdot B}{\|A\| \|B\|} = \frac{\sum\limits_{i=1}^{n} A_i B_i}{\sqrt{\sum\limits_{i=1}^{n} A_i^2} \sqrt{\sum B_i^2}}$$

COSINE SIMILARITY COMPUTATION USED TO
COMPUTE SIMILARITY BETWEEN EMBEDDINGS

OUTFIT RECOMMENDER

STORAGE SYSTEM
18

AVAILABLE INVENTORY DATA STRUCTURE
59

| ITEM ID | TAXON | EMBEDDING |
|---------|-------|-----------|
| ITEM_1 | T1 | $[S_1, S_2,..., S_N]$ |
| ITEM_2 | T3 | $[P_1, P_2,..., P_N]$ |
| ITEM_3 | T4 | $[P_1, P_2,..., P_N]$ |

⋮

PRECONFIGURED OUTFIT DATA STRUCTURE
60

| PRECONFIGURED ITEM ID | OUTFIT ID | TAXON | EMBEDDING |
|-----------------------|-----------|-------|-----------|
| A1 | A | T1 | $L_1, L_2,..., L_N$ |
| A2 | A | T3 | $M_1, M_2,..., M_N$ |
| A3 | A | T5 | $P_1, P_2,..., P_N$ |
| B1 | B | T2 | $Q_1, Q_2,..., Q_N$ |
| B2 | B | T1 | $R_1, R_2,..., R_N$ |
| B3 | B | T4 | $S_1, S_2,..., S_N$ |

⋮

ELASTICSEARCH ENGINE
61

DATA STRUCTURES FOR AVAILABLE INVENTORY
AND PRECONFIGURED OUTFIT INFORMATION
FIG. 9

ROUTING TABLE
58

| METHOD | PATH | TASK |
|---|---|---|
| GET | /PROD_ID/:ID | REQUEST COMPLEMENTARY ITEMS BASED ON PRODUCT ID |

⋮

FOR EXAMPLE

HTTPS://API.TRR.COM/PROD_ID/1111/

ROUTING TABLE
FIG. 10

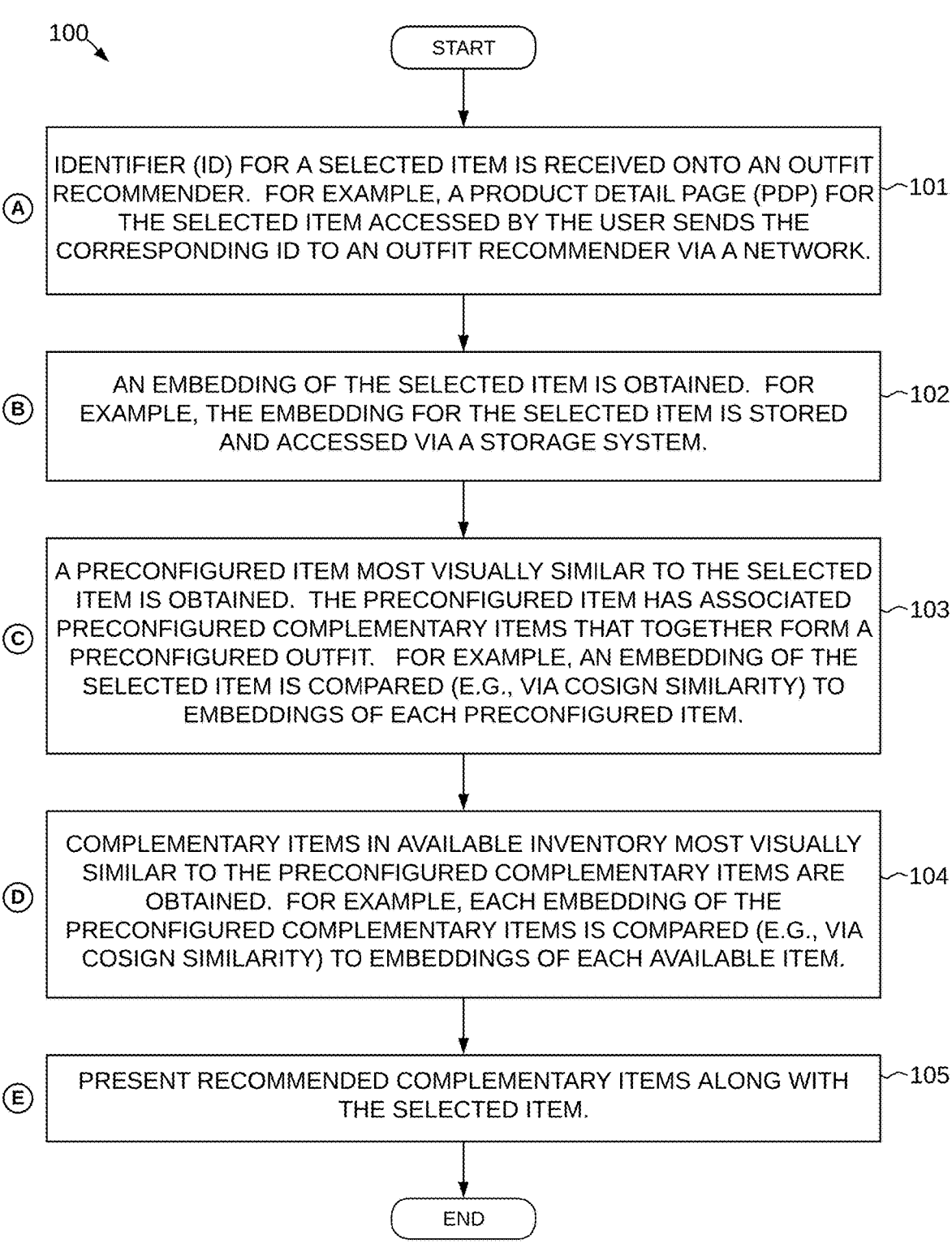

100

START (A)  IDENTIFIER (ID) FOR A SELECTED ITEM IS RECEIVED ONTO AN OUTFIT RECOMMENDER. FOR EXAMPLE, A PRODUCT DETAIL PAGE (PDP) FOR THE SELECTED ITEM ACCESSED BY THE USER SENDS THE CORRESPONDING ID TO AN OUTFIT RECOMMENDER VIA A NETWORK.  ~101

(B)  AN EMBEDDING OF THE SELECTED ITEM IS OBTAINED. FOR EXAMPLE, THE EMBEDDING FOR THE SELECTED ITEM IS STORED AND ACCESSED VIA A STORAGE SYSTEM.  ~102

(C)  A PRECONFIGURED ITEM MOST VISUALLY SIMILAR TO THE SELECTED ITEM IS OBTAINED. THE PRECONFIGURED ITEM HAS ASSOCIATED PRECONFIGURED COMPLEMENTARY ITEMS THAT TOGETHER FORM A PRECONFIGURED OUTFIT. FOR EXAMPLE, AN EMBEDDING OF THE SELECTED ITEM IS COMPARED (E.G., VIA COSIGN SIMILARITY) TO EMBEDDINGS OF EACH PRECONFIGURED ITEM.  ~103

(D)  COMPLEMENTARY ITEMS IN AVAILABLE INVENTORY MOST VISUALLY SIMILAR TO THE PRECONFIGURED COMPLEMENTARY ITEMS ARE OBTAINED. FOR EXAMPLE, EACH EMBEDDING OF THE PRECONFIGURED COMPLEMENTARY ITEMS IS COMPARED (E.G., VIA COSIGN SIMILARITY) TO EMBEDDINGS OF EACH AVAILABLE ITEM.  ~104

(E)  PRESENT RECOMMENDED COMPLEMENTARY ITEMS ALONG WITH THE SELECTED ITEM.  ~105

END

OBTAINING COMPLEMENTARY ITEMS FROM DYNAMIC
INVENTORY BASED ON PRECONFIGURED OUTFITS
FIG. 11

FILTERING RECOMMENDED ITEMS

EVENT BASED PERSONALIZED ITEM
GENERATION SYSTEM

EVENT BASED PERSONALIZED
ITEM GENERATION SYSTEM

PERSONALIZED ITEM GENERATION SYSTEM
FUNCTIONAL DIAGRAM

ITEM GENERATION SYSTEM ARCHITECTURE

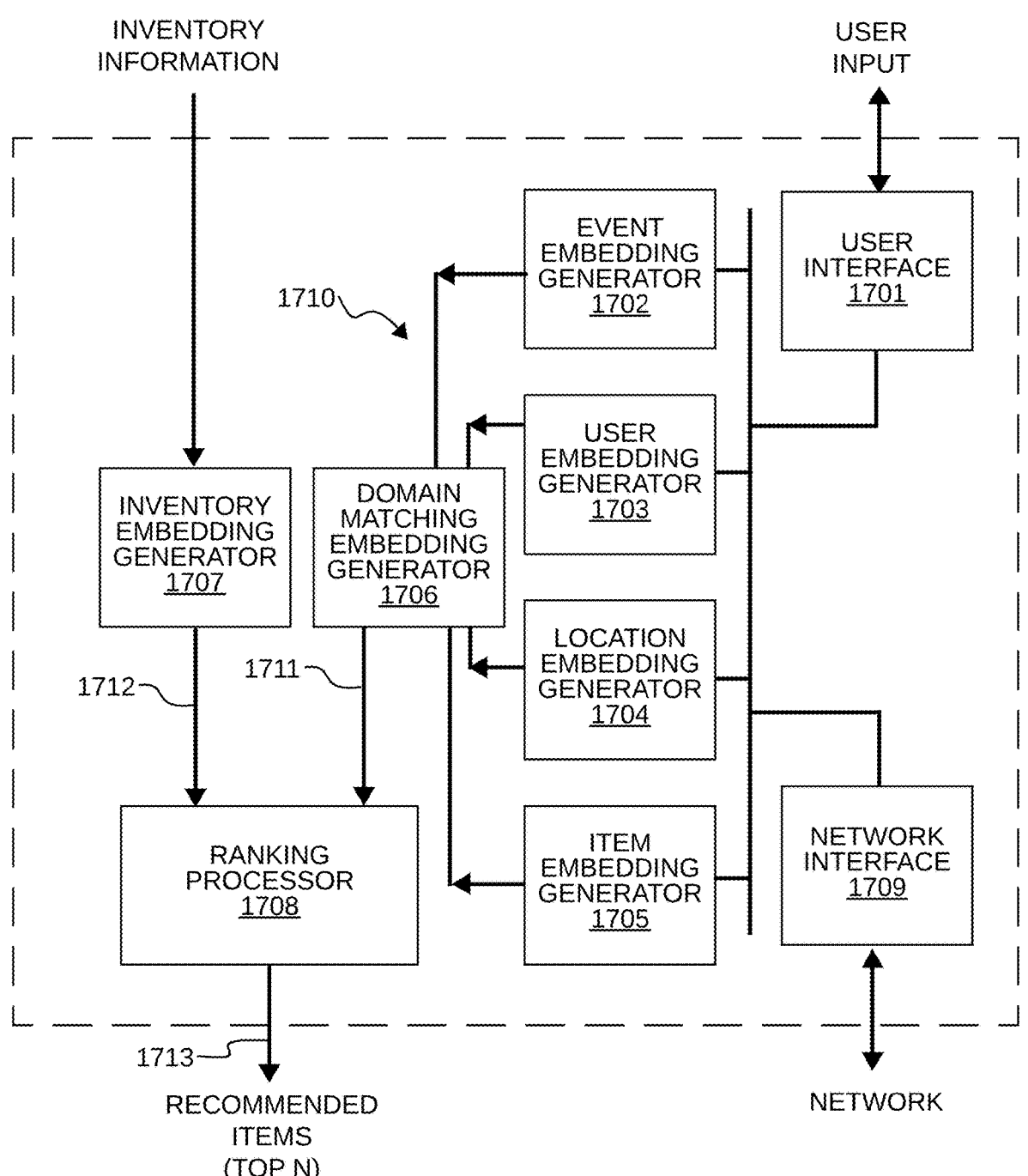

INVENTORY
INFORMATION

USER
INPUT

1710

EVENT
EMBEDDING
GENERATOR
1702

USER
INTERFACE
1701

INVENTORY
EMBEDDING
GENERATOR
1707

DOMAIN
MATCHING
EMBEDDING
GENERATOR
1706

USER
EMBEDDING
GENERATOR
1703

LOCATION
EMBEDDING
GENERATOR
1704

1712

1711

RANKING
PROCESSOR
1708

ITEM
EMBEDDING
GENERATOR
1705

NETWORK
INTERFACE
1709

1713

RECOMMENDED
ITEMS
(TOP N)

NETWORK

ALTERNATIVE EMBODIMENT OF EVENT BASED
PERSONALIZED ITEM GENERATION SYSTEM
FIG. 17

1800

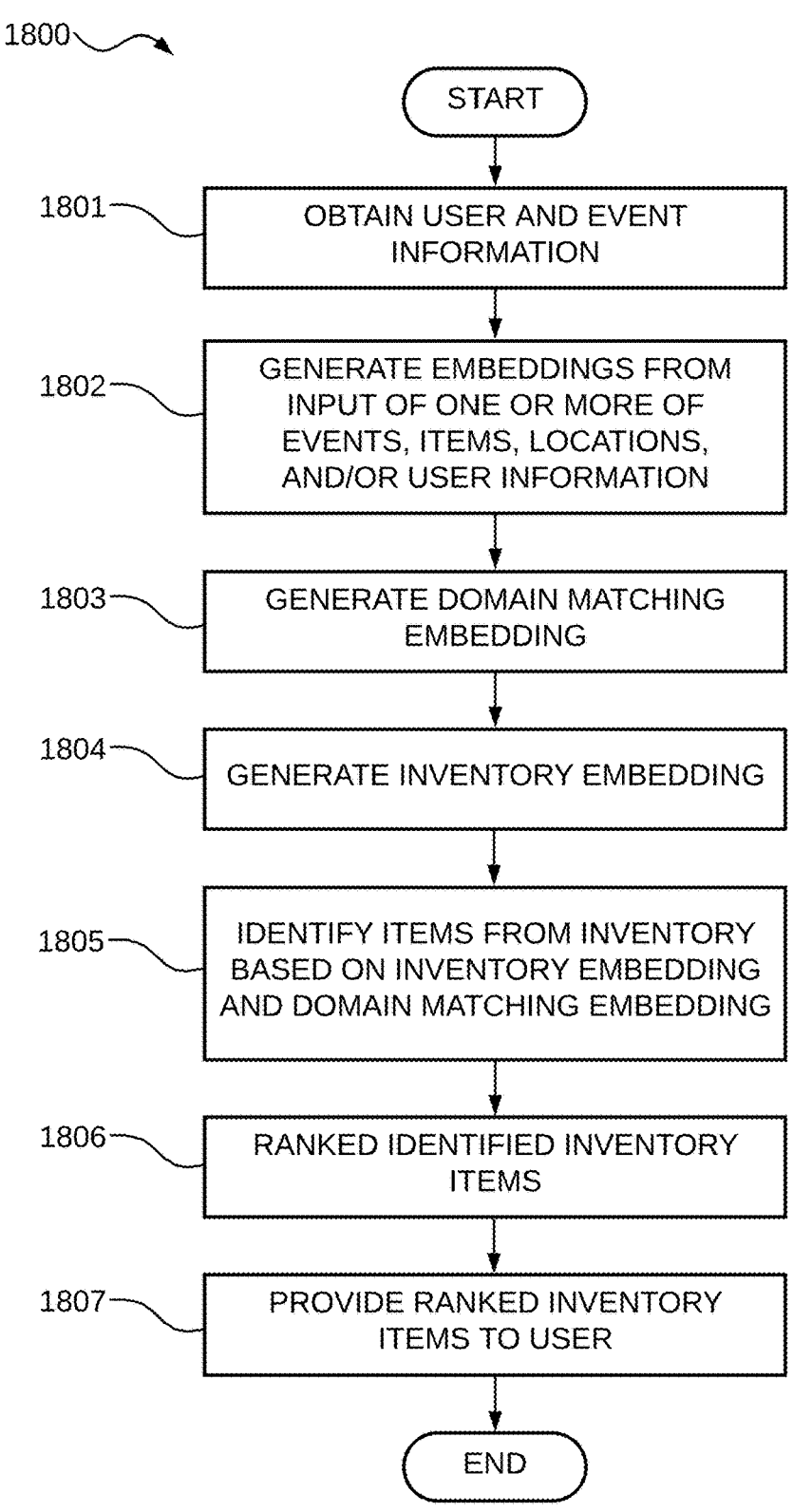

START

1801 — OBTAIN USER AND EVENT INFORMATION

1802 — GENERATE EMBEDDINGS FROM INPUT OF ONE OR MORE OF EVENTS, ITEMS, LOCATIONS, AND/OR USER INFORMATION

1803 — GENERATE DOMAIN MATCHING EMBEDDING

1804 — GENERATE INVENTORY EMBEDDING

1805 — IDENTIFY ITEMS FROM INVENTORY BASED ON INVENTORY EMBEDDING AND DOMAIN MATCHING EMBEDDING

1806 — RANKED IDENTIFIED INVENTORY ITEMS

1807 — PROVIDE RANKED INVENTORY ITEMS TO USER

END

GENERATING PERSONALIZED ITEMS BASED ON EVENT

USER INTERFACE PRESENTED ON
DEVICE

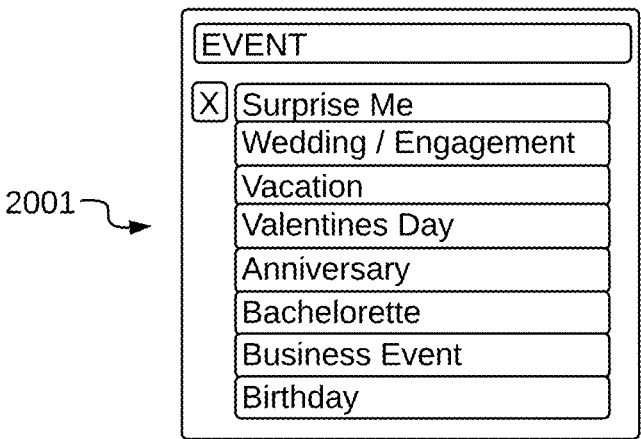

2001

EVENT SELECTOR USER INTERFACE
FIG. 20

2101

Event

Poodle Pageant

Event Description

A Poodle Pageant is an event or competition where Poodles, a popular and elegant breed of dog, are showcased and judged based on various criteria such as appearance, grooming, obedience, and overall personality. Poodle Pageants are often organized by kennel clubs, dog shows, or pet-related organization to celebrate the beauty and intelligence of this particular breed.

EVENT INFORMATION USER INTERFACE
FIG. 21

2200

NOVEL USER INTERFACE PRESENTED
ON DEVICE

ITEMS OUTPUT BASED ON EVENT

SYSTEM OUTPUT BASED ON EVENT

SYSTEM OUTPUT BASED ON EVENT

ALTERNATIVE SYSTEM OUTPUT

ALTERNATIVE SYSTEM OUTPUT

2800

START

2801 — OBTAIN USER AND EVENT INFORMATION

2802 — GENERATE EMBEDDINGS OF THE INFORMATION

2803 — FORM A COMBINED EMBEDDING

2804 — IDENTIFY ITEMS IN INVENTORY BASED ON COMBINED EMBEDDING

2805 — PROVIDE IDENTIFIED ITEMS BY RANK TO USER

END

PERSONALIZED ITEM GENERATION

GENERATING PERSONALIZED ITEM RECOMMENDATIONS BASED ON EVENT INFORMATION

CROSS REFERENCE TO RELATED APPLICATIONS

This Application is a continuation-in-part of, and claims the benefit under 35 U.S.C. § 120 from U.S. Nonprovisional patent application Ser. No. 17/863,287, entitled "Outfit Recommender System," filed on Jul. 12, 2022, the subject matter of which is expressly incorporated herein by reference.

TECHNICAL FIELD

The present invention relates generally to information filtering systems, and more specifically, to recommender systems.

BACKGROUND INFORMATION

Large retail providers often offer many types of items for sale and carry a significant variety of inventory. Retail providers typically sell items using online commerce platforms. These online commerce platforms provide customers with the functionality to purchase items from retailers through websites or through mobile applications. The customer accesses online commerce platforms via their desktop or mobile internet browsers or via a mobile application downloaded and installed on their mobile device. After selecting an item of interest to view, the customer is presented with a Product Description Page (PDP). The PDP provides the customer with information in connection with the selected item of interest, including price information and a description of the item. The customer is able to purchase the selected item via the PDP.

SUMMARY

An outfit recommender system includes an outfit recommender and a storage system. A provider entity, such as an online retailer, sells inventory via various sales channels, including online commerce platforms. The outfit recommender dynamically generates complementary item recommendations based on changing inventory and previously curated preconfigured outfits. The complementary items are generated by comparing visual similarities between preconfigured outfits and available inventory. The complementary items are presented on a PDP as suggestions to customers to purchase in addition to the selected item. As available inventory changes, recommended complementary items also change based on the static collection of preconfigured outfits. The preconfigured outfits may be added, removed, or updated as desired.

The storage system stores embedding information for available inventory and for preconfigured outfits. Embeddings are generated by supplying image data, such as an image file, to an embedding model. The embedding model receives the image data and generates a low-dimensional vector that represents the input image data. Additional information may be supplied to the embedding model and stored in the embedding. This additional information includes item description information, taxon information, price information, provider or source information, sale information, market characteristic information, filter information, or any other metadata associated with an item. The embeddings provide a technique for comparing visual similarities between the available inventory and items of the preconfigured outfits. In one embodiment, the embedding model involves one or more layers of a neural network, such as a convolutional neural network (CNN).

Available inventory changes dynamically as items are added or sold by a provider. As new items are added to inventory, new embeddings are generated and stored in the storage system. Preconfigured items are grouped together to form preconfigured outfits. The preconfigured items may remain static or may be added, updated, or removed. Even if the preconfigured items remain static, the outfit recommender will automatically generate new curated outfits as available inventory changes. The preconfigured items are generated from any source regardless of whether such items are available or exist in the market.

Conventional retailers generate curated outfits based on available items sold or available from the retailer. The novel outfit recommender system, on the other hand, provides outfit curators with unlimited flexibility in configuring outfits. In curating outfits, curators are able to select items from any designer or generate new items that do not exist or are not commercially available. This novel functionality affords curators complete creative control without limiting them to current or future inventory. The preconfigured outfits are generated from any source regardless of whether such items are available or exist in the marketplace.

In operation, a customer accesses items provided by a provider entity via an online commerce platform. When a customer selects an item to view, a request is generated and supplied to the outfit recommender that includes an identifier (ID) for the selected item. Next, an embedding for the selected item is obtained. In one example, the embedding for the selected item is retrieved from the storage system. In another example, the embedding for the selected item is generated on the fly in response to the request. Next, a preconfigured item most visually similar to the selected item is identified. In one example, the embedding of the selected item is compared via cosine similarity to each embedding of the preconfigured items belonging to the same taxon as the selected item. The matching preconfigured item that is most similar to the selected item has corresponding preconfigured complementary items that together form the preconfigured outfit. Next, complementary items most visually similar to the preconfigured complementary items are obtained. In one example, each embedding of the preconfigured complementary items is compared via cosine similarity to each embedding of the available items of the same taxon. This yields the most visually similar complementary items in available inventory that complement the selected item. Next, the complementary items are presented to the customer on a PDP along with the selected item.

Complementary items are optionally filtered based on filter and/or profile information. In one embodiment, the filter information and the profile information are generated via user input. For example, the customer might indicate their price or designer preferences in the online commerce platform. In another embodiment, the filter information and the profile information are generated by tracking user activity and by taking into consideration micro or macro customer behavior, consumer trends, price data, provider or source data, sales data, market trends, or other information usable to drive sales. In still other embodiments, the filter information and the profile information are generated from a combination of user input and other collected information.

The novel outfit recommender provides dynamic outfit recommendations based on static, pre-curated outfits that change as available inventory changes. In the case of a single stock-keeping unit (SKU) provider, such as an online consignment entity that might only carry one of an item rather than many, many quantities of any given item, the novel outfit recommender yields significant technical advancements. The single SKU provider does not have to spend resources on crafting curated outfits based on available inventory. Rather, once a quantity of pre-curated outfits have been generated, the single SKU provider is able to provide dynamic creation of recommended complementary outfits as available inventory changes. As new items are added to or removed from available inventory, complementary item recommendations will automatically adapt and change without any further user input. This is a significant advancement in online retail in which conventional retailers conventionally rely upon known inventory to generate curated outfit recommendations.

In another embodiment, an event based personalized item generation system recommends available items in inventory to users based on upcoming events. The event based personalized item generation system includes a storage system and an event based item generator. The event based item generator of the event based personalized item generation system receives available inventory information, user information for a user, and event information for an upcoming event, and generates a list of recommended items the system predicts will be of interest to the user attending the event. The event information is obtained from LLMs, AI models, stored data, scraping, or user input and includes event type, location, event setting, climate, local culture, and other event-related information. The user information indicates buying preferences of the user, including price range, designer or item source, taxon, color, sizing, gender, historical purchases, and other user preference information. In one example, the event based item generator is implemented as a computing instance operating on a cloud computing platform.

In operation of the event based personalized item generation system, the event based personalized item generator generates one or more embeddings from the event information, user information, and the available inventory information. A domain matching model receives an event embedding and a user embedding and generates therefrom a domain matching embedding. The domain matching embedding has the same dimension as available inventory embeddings thereby allowing comparison between the domain matching embedding and the available inventory embeddings. A ranking model is used to identify embeddings of the available inventory embeddings most similar to the domain matching embedding. The ranking model yields the items most likely to be of interest to the user attending the event. In one embodiment, the domain matching model receives additional embeddings, such as a location embedding and an item embedding, and uses the event embedding, the user embedding, the location embedding, and the item embedding in generating the domain matching embedding.

In one application, the inventory is provided by a single SKU (stock keeping unit) provider. The novel recommender systems and techniques are particularly invaluable to providers having many unique, single SKU (Stock Keeping Unit) items in inventory. For a single SKU provider, every item in inventory is unique. Once the item is sold, there are no longer any items in inventory having the same SKU, until a new item of the same SKU is added to inventory. One example of a single SKU provider is an online consignor that consigns many unique items and carries a significant quantity of unique items in inventory at any given time. There are cases where a single SKU provider might have multiples of such items, but these quantities are insignificant compared to the number of items for each SKU a conventional retailer will carry in inventory.

The single SKU providers have unique problems that are not experienced by conventional retailers. A single SKU provider does not have many items having the same SKU for purposes of generating recommendations. Since each item is unique, a single SKU provider must predict items of interest to customers in a significantly large and evolving inventory. Once an item is sold, it is no longer in inventory. New items are also added to the inventory having SKUs that are new to the single SKU provider and never previously offered by the single SKU provider.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a detailed diagram of storage system 18.

FIG. 10 is a detailed diagram of a routing table 58.

FIG. 11 is a flowchart of a method in accordance with at least one novel aspect.

FIG. 17 is an alternative embodiment of an event based personalized item generation system.

FIG. 18 is a flow graph of a method for personalized item generation.

FIGS. 19-27 show exemplary screenshots in accordance with at least one novel aspect.

DETAILED DESCRIPTION

Reference will now be made in detail to some embodiments of the invention, examples of which are illustrated in the accompanying drawings.

Figure 1:
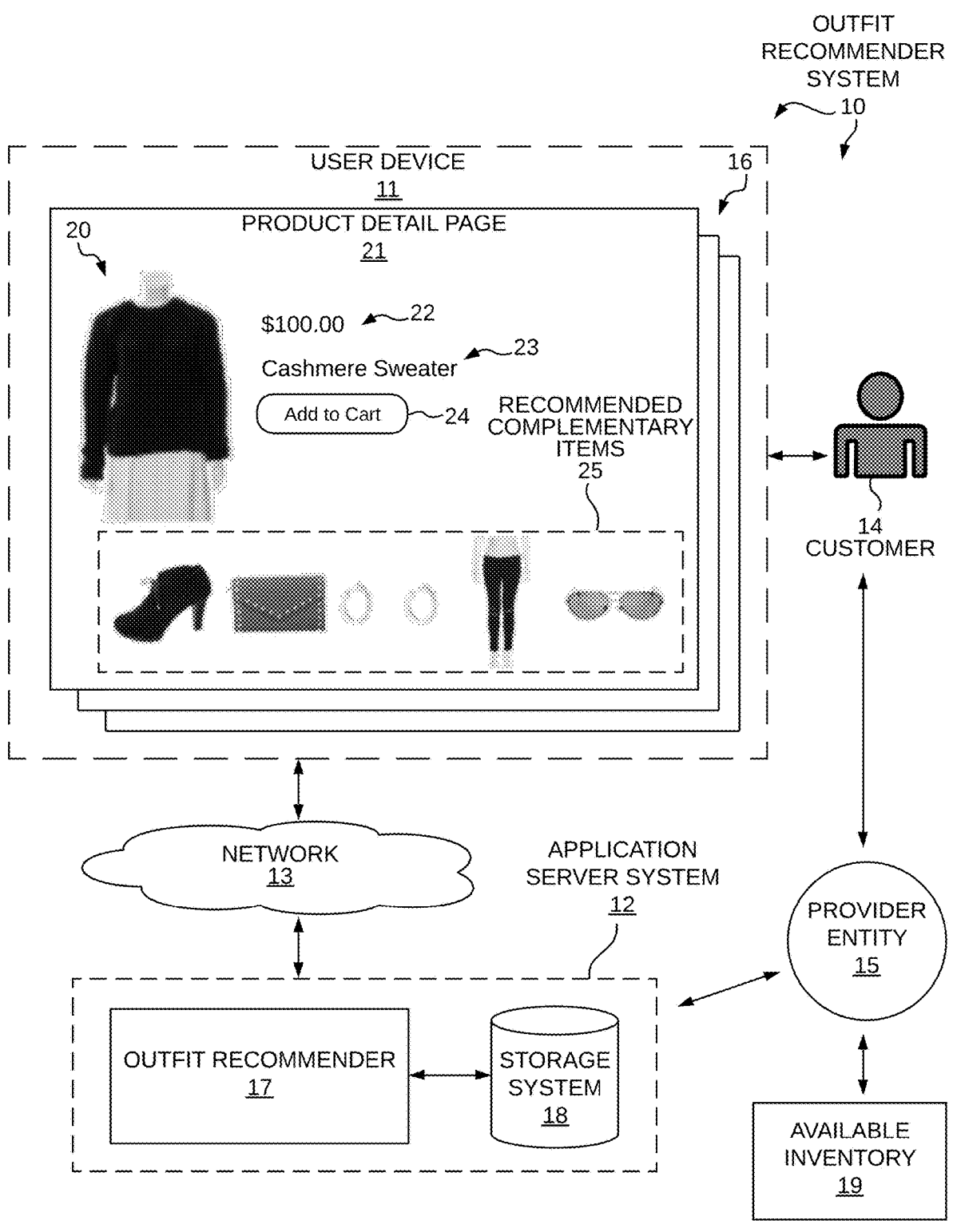
FIG. 1 is a diagram of an outfit recommender system 10 in accordance with one embodiment.

FIG. 1 is a diagram of an outfit recommender system 10 in accordance with one embodiment. The outfit recommender system 10 includes a user device 11 and an application server system 12. The user device 11 communicates with the application server system 12 over a network 13. The application server system 12 provides an electronic commerce platform that allows a customer 14 to view and purchase items provided by a provider entity 15. The user device 11 is a mobile device, tablet, desktop computer, VR/AR headset, virtual assistant device, or any other network-enabled device suitable to access the electronic commerce platform. The provider entity 15 is an entity that manages and sells inventory, such as an online retailer or online consignor. The customer 14 views one or more items presented on product detail pages 16 via the user device 11. The product detail pages 16 are presented via a mobile application or internet browser operating on the user device 11.

The application server system 12 comprises an outfit recommender 17 and a storage system 18. The application server system 12 includes additional components and hardware (not shown) that provide product detail pages 16 and allow provider entity 15 to manage inventory 19 and other functionality associated with offering items for sale. In one embodiment, the outfit recommender 17 and the storage system 18 operate across a distributed network. For example, the outfit recommender 17 is realized as a Compute Engine virtual machine operating on Google Cloud infrastructure and the storage system 18 is realized as an Elasticsearch Service operating on the Google Cloud infrastructure.

In operation, the customer 14 selects an item of interest to view. The selected item is presented on a product detail page (PDP) 21. The PDP 21 presents an image of the selected item 20, price information 22, a description 23, a purchasing user interface element 24, and recommended complementary items 25. In this example, the selected item 20 is a "Cashmere Sweater" that costs "$100.00" and is available for purchase via the "Add to Cart" button 24 presented on the PDP 21. After purchase is completed, the provider entity 15 ships the physical item represented by selected item 20 to the customer 14 and the storage system 18 is updated to reflect the change in available inventory.

In accordance with at least one novel aspect, the recommended complementary items 25 are dynamically generated by the outfit recommender 17 from available inventory 19 based on previously curated preconfigured outfits. The preconfigured outfits need not be arranged based on available, known, or prior existing inventory. The complementary items 25 are generated dynamically by comparing visual similarities between preconfigured outfits and available inventory. The complementary items 25 are presented on the PDP 21 as suggestions to customer 14 to purchase in addition to the selected item 20. The selected item 20 and the recommended complementary items 25 provide a dynamically curated outfit recommendation provided by the provider entity 15 that changes without user input as available inventory changes. As available inventory changes, recommended complementary items will also change based on the static collection of preconfigured outfits. The preconfigured outfits may be added, removed, or updated as desired.

Figure 2:
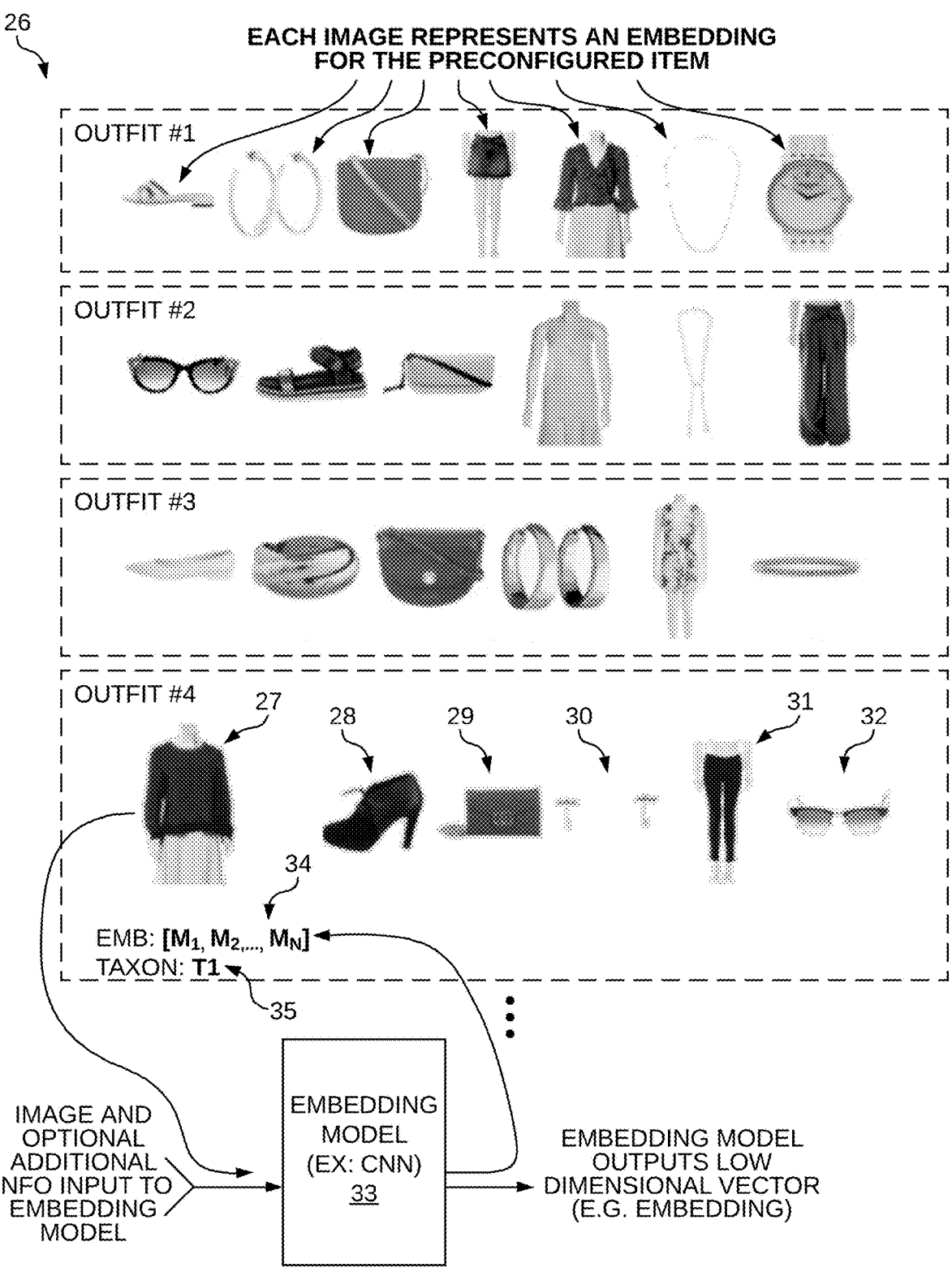
FIG. 2 is a diagram showing how embeddings 26 for items of preconfigured outfits are generated and stored in storage system 18.

FIG. 2 is a diagram showing how embeddings 26 for items of preconfigured outfits are generated and stored in storage system 18. Each preconfigured outfit includes a plurality of items. An item in a preconfigured outfit is referred to as a "preconfigured item" and other items in the preconfigured outfit are referred to as "preconfigured complementary items". Four preconfigured outfits (#1-#4) are shown in FIG. 2, however, many more preconfigured outfits are optionally generated and stored in the storage system 18. Each of the preconfigured outfits #1-#4 includes image data corresponding to items that are deemed by a curator to form a desirable outfit. For example, outfit #4 includes image data 27 corresponding to a sweater, image data 28 corresponding to shoes, image data 29 corresponding to a purse, image data 30 corresponding to earrings, image data 31 corresponding to jeans, and image data 32 corresponding to sunglasses.

Each image shown in FIG. 2 represents an embedding generated using an embedding model 33. The embedding model 33 receives image data and any additional information and generates a low-dimensional vector. The low-dimensional vector output by the embedding model 33 represents the input image data and any additional input information. Additional information includes item description information, taxon information, price information, provider or source information, sale information, market characteristic information, filter information, or any other metadata associated with an item.

In the example of FIG. 2, outfit #4 includes the image data 27 corresponding to a sweater. The image data 27 is supplied to an embedding model 33 in addition to optional additional information. The additional information used to generate the embedding 34 might include description information, taxon information, price information, brand or designer information, or sales history of the item. The embedding model 33 generates and outputs an embedding 34 from the image data 27 and optional additional information. In one example, taxon information 35 ("T1") is also represented in the embedding 34. The embedding 34 is represented by a one-dimensional array $[M_1, M_2, \ldots M_N]$. For each item of the preconfigured outfits, an embedding is generated and stored in the storage system 18.

In accordance with at least one novel aspect, the novel outfit recommender system 10 provides functionality that allows for curators and retailers to generate preconfigured outfits that are used by the outfit recommender 17 to dynamically generate visually similar outfits based on unknown or constantly changing available inventory. Conventional retailers generate curated outfits based on available items sold or available from the retailer. On the other hand, novel system 10 provides outfit curators with unlimited flexibility in configuring outfits. In curating outfits, curators are able to select items from any designer or generate new items that do not exist or are not commercially available. This novel functionality provided by the outfit recommender system 10 is advantageous because it affords curators complete creative control without limiting them to current or future inventory. Rather, the preconfigured outfits are generated from any source regardless of whether such items are available or exist in the marketplace.

Figure 3:
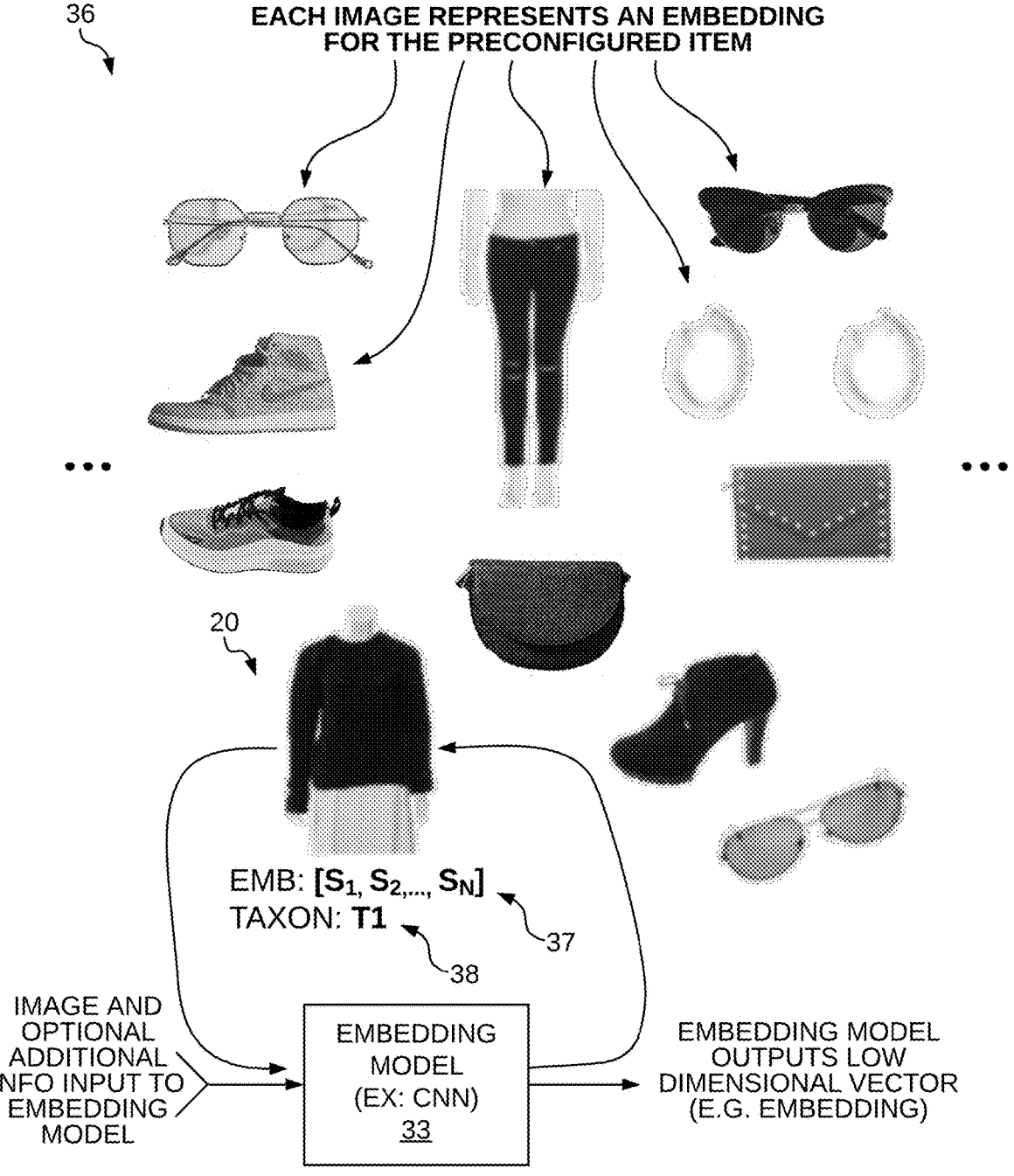
FIG. 3 is a diagram showing how embeddings 36 for items in available inventory 19 are generated and stored in storage system 18.

FIG. 3 is a diagram showing how embeddings 36 for items in available inventory 19 are generated and stored in storage system 18. Each item in available inventory 19 is stored as an embedding in the storage system 18. For example, image data 20 corresponds to the sweater selected by the customer 14 and presented on PDP 21 of FIG. 1. Items in available inventory 19 change dynamically throughout sales cycles. As items are sold or added, available inventory 19 is updated accordingly. As such, embeddings stored in the storage system 18 in connection with available inventory 19 are continuously added, updated, or removed over time.

Each image shown in FIG. 3 represents an embedding generated using an embedding model. For example, embedding 37 is shown directly below image data 20 for the selected item. The embedding model 33 receives image data and any additional information and generates a low-dimensional vector. The low-dimensional vector output by the embedding model 33 represents the input image data and any additional input information. Additional information includes item description information, taxon information, price information, provider or source information, sale information, market characteristic information, filter information, or any other metadata associated with an item.

In the example of FIG. 3, the image data 20 is supplied to the embedding model 33 in addition to optional additional information. The additional information used to generate the embedding 37 might include description information, taxon information, price information, brand or designer information, or sales history of the item. The embedding model 33 generates and outputs an embedding 37 from the image data 20 and optional additional information. In one example, taxon information 38 ("T1") is also represented in the embedding 37. The embedding 37 is represented by a one-dimensional array $[S_1, S_2, \ldots S_N]$. For each item in inventory 19, an embedding is generated and stored in the storage system 18.

Figure 4:
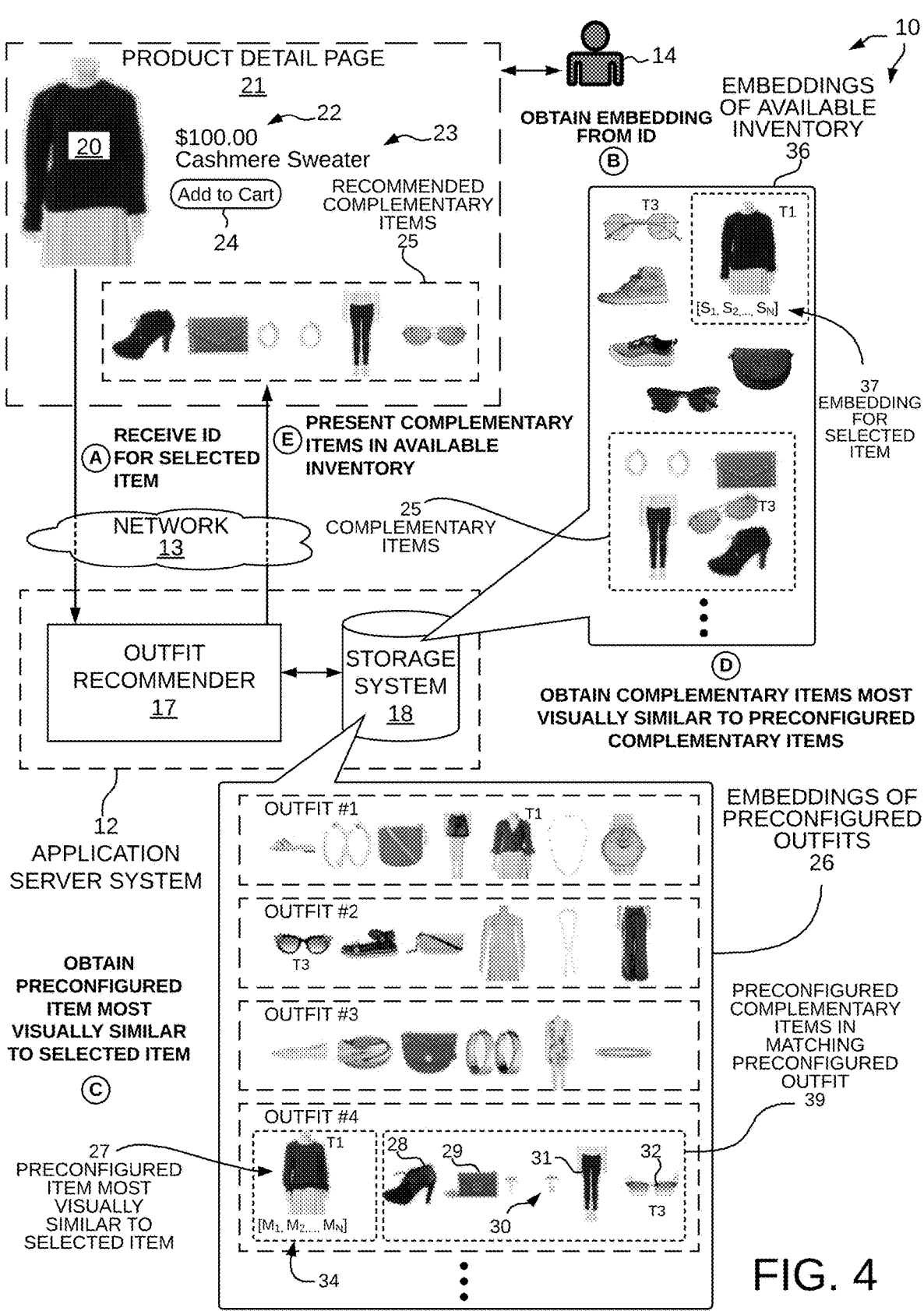
FIG. 4 is a diagram that shows operation of the outfit recommender system 10.

FIG. 4 is a diagram that shows operation of the outfit recommender system 10. A customer 14 accesses an electronic commerce platform associated with the provider entity 15. In this example, the electronic commerce platform is an online website or mobile application that communicates with the application server system 12 over the network 13 and is accessed via the user device 11. The user device 11 is not shown in FIG. 4. The online website or mobile application associated with the electronic commerce platform includes various product detail pages 16 allowing the customer 14 to view and purchase any items of interest. In this example, the customer 14 selects to view the image for a selected item 20. The outfit recommender 17 receives the request and performs various novel steps (labeled "A" through "E") to render a PDP 21 showing the image of the selected item 20 along with recommended complementary items 25.

First, an identifier ("ID") associated with selected item 20 is received onto the outfit recommender 17 (labeled as "A"). The identifier is a unique key that is used to identify and track items internally within the application server system 12. The identifier is also referred to as a "product ID", "item ID", or "ID" depending on the implementation. In this example, the identifier is received onto the outfit recommender 17 as a HTTP GET request in response to the customer 14 selecting to view selected item 20.

Next, an embedding associated with the selected item 20 is obtained (labeled as "B"). Each embedding is a low-dimensional vector that is generated using an embedding model. The embedding model reduces dimensionality of image data and any other input data associated with the item. The embedding represents image information, taxon, price, designer or source information associated with the item, description or characteristic information of the item, sale information, market characteristics associated with the item (e.g. time on marketplace or supply-chain information), filter information (e.g. customer profile characteristics), or other information useful in grouping or classifying items.

In one embodiment, embeddings 36 for each item in available inventory 19 are generated beforehand and are stored in the storage system 18 as explained in connection with FIG. 3. Each image of available inventory 19 shown in FIG. 4 represents an embedding. The storage system 18 need not store actual images. Instead, the images represent data embeddings and are only shown throughout the diagrams for purposes of easing explanation. The embedding for an item is accessed using the ID for the item. In this example, embedding 37 for selected item 20 is stored in the storage system 18. In another embodiment, embeddings for each item in available inventory 19 are generated dynamically rather than being generated and stored before the request.

Next, a preconfigured item most visually similar to the selected item 20 is obtained (labeled as "C"). The preconfigured item has associated preconfigured complementary items that together form a preconfigured outfit. Embeddings 26 for preconfigured outfits are stored in the storage system 18. Each image of the preconfigured outfits shown in FIG. 2 represents an embedding. Each embedding is grouped together with other embeddings that together form a preconfigured outfit. In this example, the preconfigured item 27 is determined to be most visually similar to the selected item 20.

In this embodiment, visual comparison is performed by computing cosine similarity values between the embedding 37 of the selected item 20 to each embedding 26 of the preconfigured outfits having the same taxon as the selected item 20. The cosine similarity values are sorted and ranked to obtain a most visually similar item. In the instant example, the selected item 20 is a taxon of type "sweater" labeled "T1". As such, the embedding 37 of the selected item 20 is compared to embeddings 26 in the preconfigured outfits also having the taxon of type "sweater" labeled "T1". This reduces the number of comparison operations that must be performed and improves operation and efficiency of system 10. The embedding 34 of preconfigured item 27 is determined to have the greatest cosine similarity value in this example. The embeddings 39 of preconfigured complementary items of matching outfit #4 will be used in generating the recommended complementary items.

Next, complementary items in available inventory most visually similar to the preconfigured complementary items are obtained (labeled as "D"). In this example, each embedding 39 of the preconfigured complementary items is compared via cosine similarity to embeddings 36 of available inventory having the same taxon. Computed cosine similarity values are ranked and sorted to obtain a most visually similar complementary item available in inventory 19. This process is performed for each preconfigured complementary item in the matching outfit. For example, an embedding 32 for sunglasses in matching outfit #4 is compared to each embedding in available inventory 19 having a taxon of type "sunglasses" labeled as "T3". This process is repeated for each of the remaining preconfigured complementary items 28-31 until the most visually similar complementary items in available inventory 19 are identified.

Next, the identified complementary items are presented to the customer along with the selected item 20 (labeled as "E"). In this example, the selected item 20 is presented to the customer 14 on the PDP 21 along with the images of recommended complementary items 25. Customer 14 is able to view PDPs for each complementary item 25 to view additional information, purchase the item, or view other complementary items on the respective PDP for the complementary item of interest. Upon selecting a complementary item, a PDP is presented along with new complementary items identified via the novel process described in the present disclosure.

Figure 5:
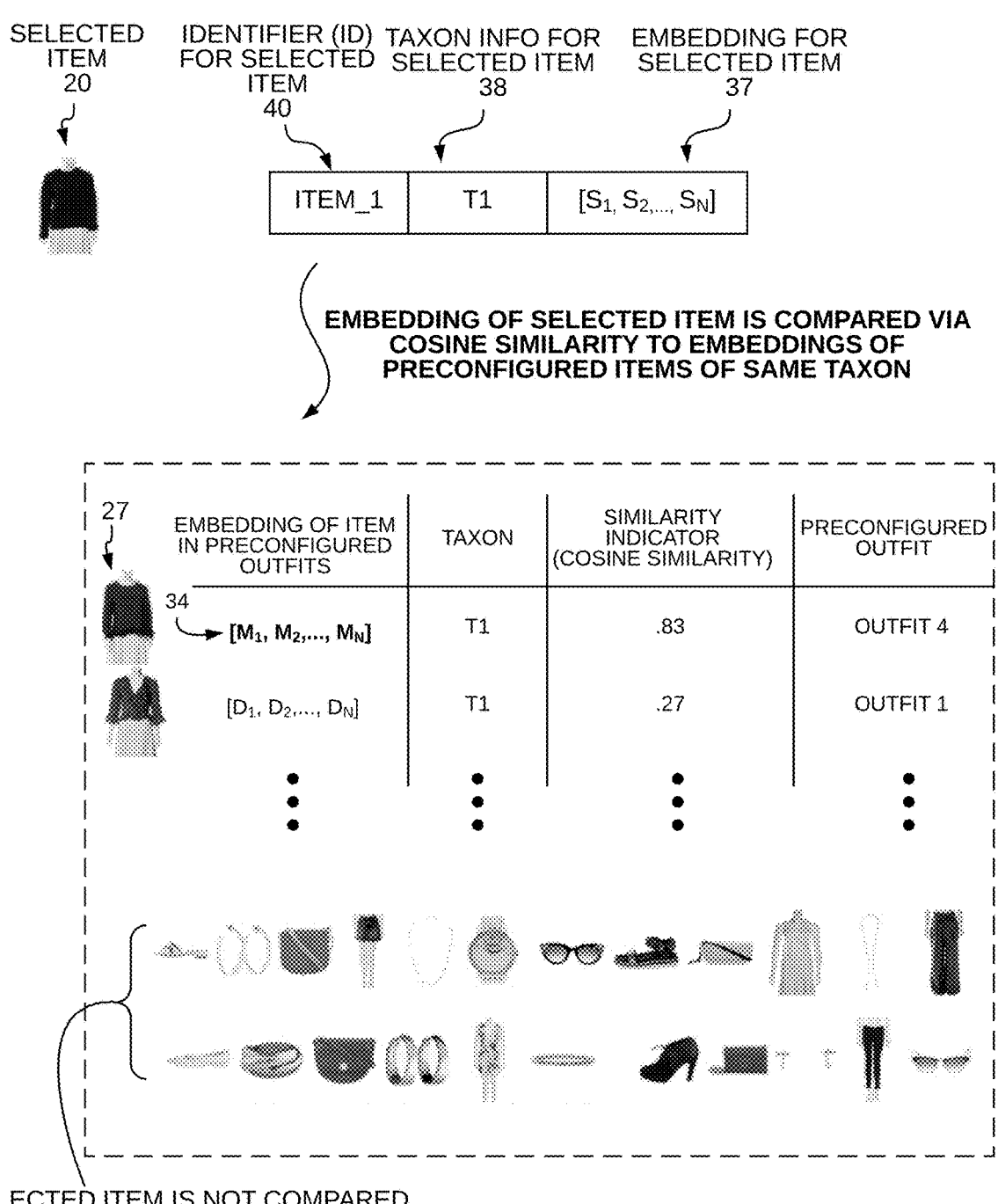
FIG. 5 is a diagram showing how outfit recommender 17 identifies an item of the preconfigured outfits most visually similar to a selected item 20.

FIG. 5 is a diagram showing how the outfit recommender 17 identifies an item of the preconfigured outfits most visually similar to the image of the selected item 20. The selected item 20 has a unique identifier ("ITEM_1" ID) 40, taxon information 38 ("T1" identifies "sweaters"), and embedding 37 ([S$_1$, S$_2$, . . . S$_N$]). The embedding 37 for the selected item 20 is compared to each embedding 26 of the preconfigured outfits of the same taxon to obtain a most visually similar preconfigured item of the preconfigured outfits. In this embodiment, embeddings are compared to each other via cosine similarity. The cosine similarity values are ranked and sorted. The largest cosine similarity value indicates the most visually similar preconfigured item. In this example, embedding 34 corresponding to preconfigured item 27 of outfit #4 yields the greatest cosine similarity value of "0.83", indicating that preconfigured item 27 is the most visually similar to selected item 20. Preconfigured items of different taxons are not compared to the selected item 20, thereby reducing utilization of computational resources and increasing operating speed. In other embodiments, techniques other than cosine similarity are used to compare image or embedding data to identify most visually similar items.

Figure 6:
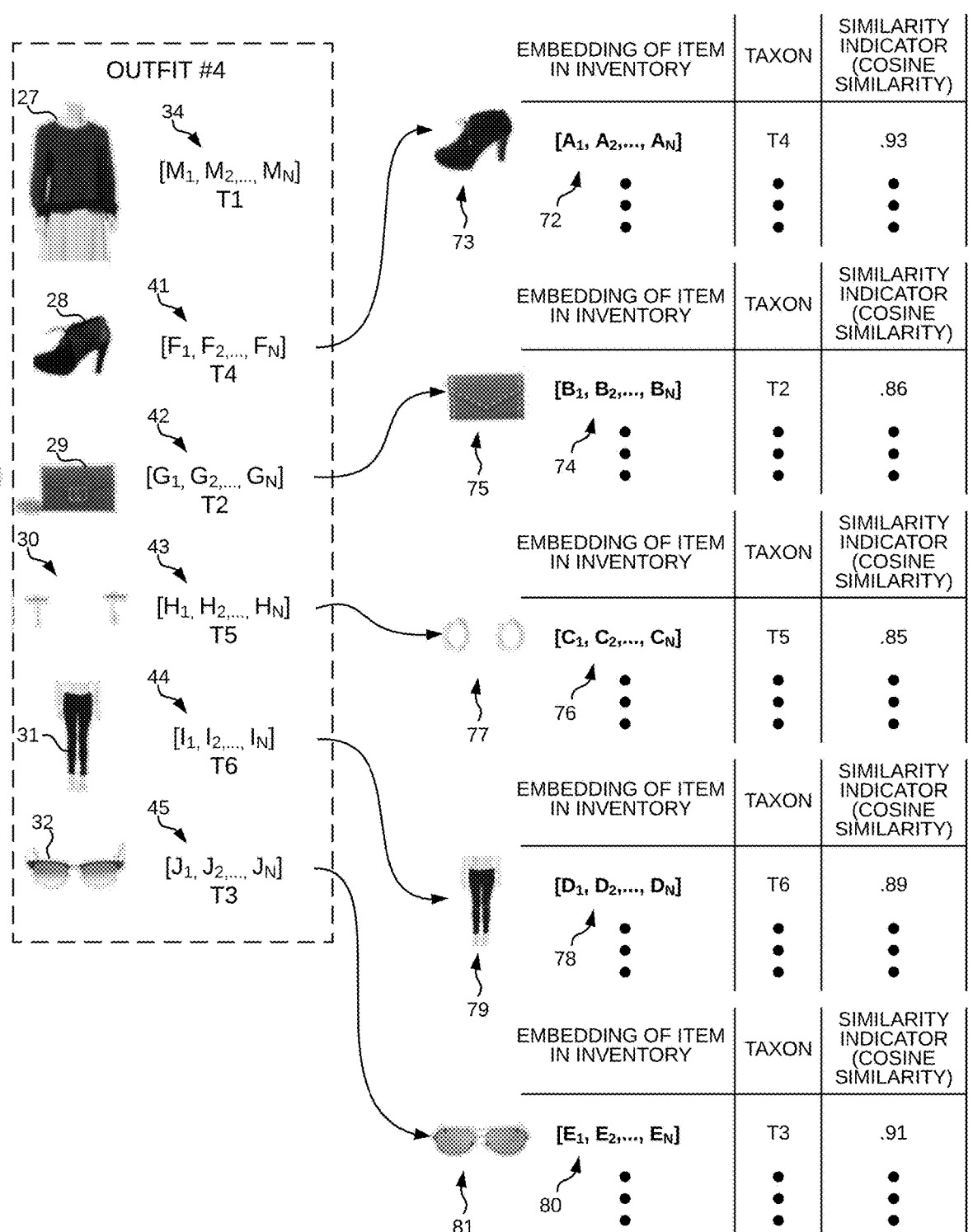
FIG. 6 is a diagram showing how outfit recommender 17 identifies complementary items in available inventory 19 most visually similar to preconfigured complementary items 39.

FIG. 6 is a diagram showing how the outfit recommender 17 identifies complementary items in available inventory 19 most visually similar to preconfigured complementary items 39. After determining that preconfigured item 27 is the most visually similar item in the preconfigured outfits to selected item 20, each of the preconfigured complementary items 39 associated with the preconfigured item 27 in outfit #4 is used to obtain complementary items in available inventory that complement the selected item 20. The visual comparison for each preconfigured complementary item is shown in FIG. 6 and described below.

Embedding 41 corresponding to preconfigured complementary item 28 ("shoes") of outfit #4 is compared to each embedding 36 of available inventory 19 having the same taxon ("T4"). Embedding 72 corresponding to item 73 yields the greatest cosine similarity value of "0.93" as compared to other cosine similarity computations for other available items of the same taxon ("T4"). This indicates that item 73 in available inventory 19 is the most visually similar to preconfigured complementary item 28.

Embedding 42 corresponding to preconfigured complementary item 29 ("bag") of outfit #4 is compared to each embedding 36 of available inventory 19 having the same taxon ("T2"). Embedding 74 corresponding to item 75 yields the greatest cosine similarity value of "0.86" as compared to other cosine similarity computations for other available items of the same taxon ("T2"). This indicates that item 75 in available inventory 19 is the most visually similar to preconfigured complementary item 29.

Embedding 43 corresponding to preconfigured complementary item 30 ("earrings") of outfit #4 is compared to each embedding 36 of available inventory 19 having the same taxon ("T5"). Embedding 76 corresponding to item 77 yields the greatest cosine similarity value of "0.85" as compared to other cosine similarity computations for other available items of the same taxon ("T5"). This indicates that item 77 in available inventory 19 is the most visually similar to preconfigured complementary item 30.

Embedding 44 corresponding to preconfigured complementary item 31 ("pants") of outfit #4 is compared to each embedding 36 of available inventory 19 having the same taxon ("T6"). Embedding 78 corresponding to item 79 yields the greatest cosine similarity value of "0.89" as compared to other cosine similarity computations for other available items of the same taxon ("T6"). This indicates that item 79 in available inventory 19 is the most visually similar to preconfigured complementary item 31.

Embedding 45 corresponding to preconfigured complementary item 32 ("sunglasses") of outfit #4 is compared to each embedding 36 of available inventory 19 having the same taxon ("T3"). Embedding 80 corresponding to item 81 yields the greatest cosine similarity value of "0.91" as compared to other cosine similarity computations for other available items of the same taxon ("T3"). This indicates that item 81 in available inventory 19 is the most visually similar to preconfigured complementary item 32. Complementary items 73, 75, 77, 79, and 81 are presented to the customer 14 as available complementary items on the PDP 21.

Figures 7, 8:
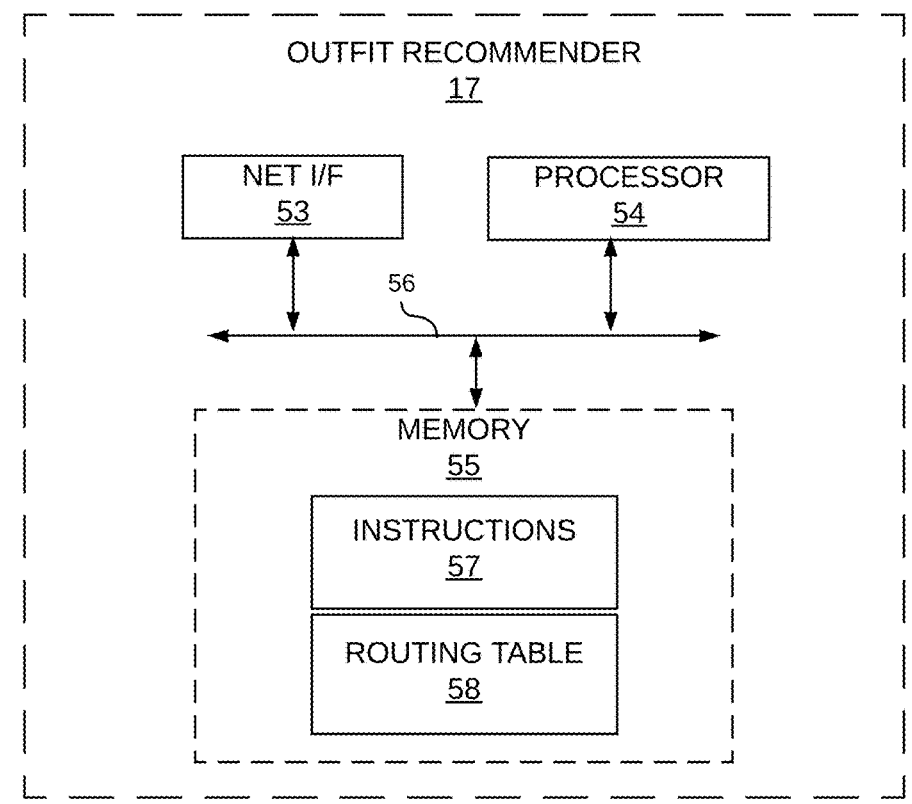
FIG. 7 is an equation 52 for computing cosine similarity between two embeddings.
FIG. 8 is a detailed diagram of the outfit recommender 17.

FIG. 7 is an equation 52 for computing cosine similarity between two embeddings. Equation 52 measures the similarity between two vectors. Embeddings are compared to each other using equation 52. In equation 52, "A" represents a first embedding and "B" represents a second embedding. The resulting computation of equation 52 indicates how similar two embeddings are to each other. It is appreciated that cosine similarity is but one technique for comparing similarity between two embeddings and that other embodiments use different techniques to compare embeddings.

FIG. 8 is a detailed diagram of the outfit recommender 17. The outfit recommender 17 includes a network interface 53, a processor 54, a memory 55, and a communication link or bus 56. The memory 55 includes an amount of computer readable instructions 57 and a routing table 58. The instructions 57 perform the novel method to obtain complementary items from dynamically changing available inventory based on preconfigured outfits. The routing table 58 is used to receive and process representational state transfer application programming interface (REST API) requests received over a network. In one embodiment, various components of the outfit recommender 17 are realized as cloud computing resources, such as Google Cloud Platform (GCP), Amazon Web Services (AWS), or Microsoft Azure, that operate over a distributed network.

FIG. 9 is a detailed diagram of storage system 18. The storage system 18 comprises an available inventory data structure 59, a preconfigured outfit data structure 60, and an elasticsearch engine 61. The available inventory data structure 59 stores information for available inventory including an item identifier (ID), taxon information, and embedding information for each item. Data in the available inventory data structure 59 changes dynamically as items are sold or added to inventory 19. The preconfigured outfit data structure 60 stores information for preconfigured outfits including a preconfigured item identifier (ID), an outfit identifier (ID), taxon information, and embedding information for each preconfigured item. The preconfigured outfit data structure 60 tends to remain static but can be modified to add new outfit configurations or to remove or modify existing outfits. The elasticsearch engine 61 provides an API accessible by the outfit recommender 17 to obtain and compare embeddings for items in available inventory and preconfigured outfits. The elasticsearch engine 61 is a distributed, RESTful search and analytics engine available from elastic.co/elasticsearch.

FIG. 10 is a detailed diagram of a routing table 58. The routing table 58 indicates how REST API requests are to be handled by the outfit recommender 17. The routing table 58 shown in FIG. 10 includes one entry for an HTTP (Hyper-Text Transfer Protocol) GET request. When a product ID is received onto the outfit recommender 17 via an HTTP GET request, the outfit recommender 17 processes the request and returns complementary items via the novel process.

FIG. 11 is a flowchart of a method 100 in accordance with at least one novel aspect. In a first step (step 101), an identifier (ID) for a selected item is received onto an outfit recommender. For example, in FIG. 2, the PDP 21 for the selected item 20 accessed by the customer 14 sends the corresponding ID to an outfit recommender 17 via a network 13.

In a second step (step 102), an embedding of the selected item is obtained. For example, in FIG. 4, the embedding 26 for the selected item 20 is stored and accessed via a storage system 18.

In a third step (step 103), a preconfigured item most visually similar to the selected item is obtained. The pre-configured item has associated preconfigured complementary items that, together, form a preconfigured outfit. For example, in FIG. 4, an embedding 26 of the selected item 20 is compared (e.g., via cosine similarity) to embeddings of each preconfigured item.

In a fourth step (step 104), complementary items in available inventory most visually similar to the preconfig-ured complementary items are obtained. For example, in FIG. 4, each embedding 29 of the preconfigured comple-mentary items is compared (e.g., via cosine similarity) to embeddings of each available item.

In a fifth step (step 105), the recommended complemen-tary items 25 are presented along with the selected item 20. For example, in FIG. 4, recommended complementary items 25 are presented on the PDP 21 to customer 14.

Figure 12:
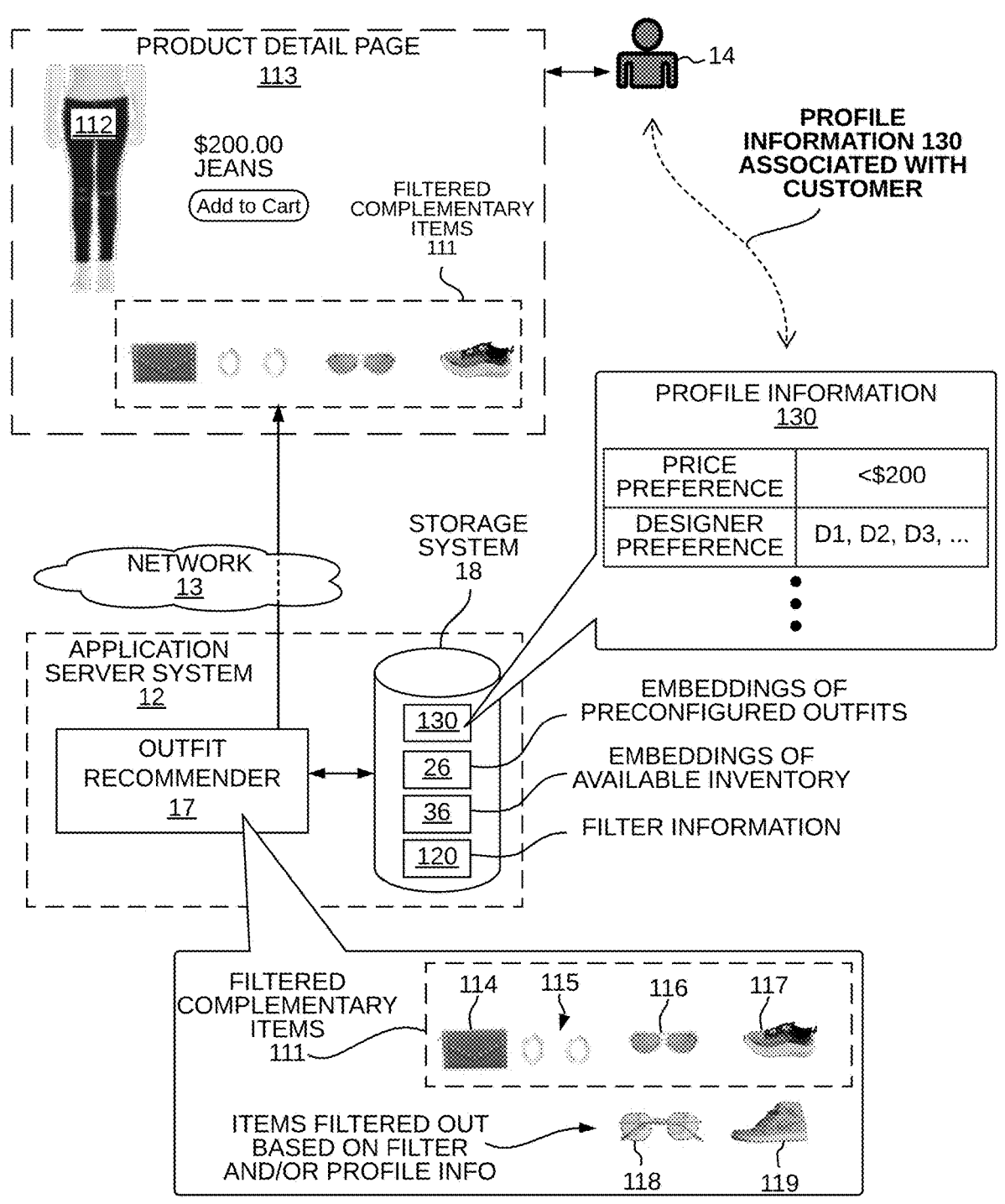
FIG. 12 is a diagram showing how recommended complementary items are optionally filtered based on filter information 120 and profile information 130.

FIG. 12 is a diagram showing how recommended comple-mentary items are optionally filtered based on filter infor-mation 120 and profile information 130. In one embodiment, the storage system 18 stores filter information 120 and profile information 130 in addition to the embedding infor-mation 26 of preconfigured outfits and embedding informa-tion 36 of available inventory 19. The filter information 120 and profile information 130 are used by the outfit recom-mender 17 to determine items to include or exclude from the filtered complementary items 111. The filter information 120 is generated by analyzing individual customer behavior, consumer trends, price data, provider or source data, sales data, market trends, or other information usable to drive sales. The profile information 130 is generated by the outfit recommender 17, by customer input, or by a combination of both. For example, a customer may optionally select to view complementary items within a certain price range or by certain designers.

After customer 14 selects to view details for selected item 112, PDP 113 is presented showing information in connec-tion with selected item 112 and recommended complemen-tary items 111. The recommended complementary items 111 presented to customer 14 include items 114 ("purse"), 115 ("earrings"), 116 ("sunglasses"), and 117 ("shoes"). Items 118 ("sunglasses") and 119 ("shoes") are filtered out and not presented to the customer 14, even though they were deemed by the outfit recommender 17 to have been acceptable recommended item options. Items 118 and 119 are filtered out based on the filter information 120 and/or profile infor-mation 130. The filter information 120 and/or profile infor-mation 130 indicates that item 116 is more likely to result in a sale than item 118. The outfit recommender 17 utilizes filter information 120 and/or profile information 130 in determining that item 117 is more likely to result in a sale than item 119. In one example, items 118 and 119 are filtered out because they are not consistent with the price range ("<$200") or designer preference ("D1, D2, D3, . . . ") set by customer 14 or determined by outfit recommender 17 to be a preference of the customer 14. In another example, items 118 and 119 are filtered out as being less likely to result in sales after considering customer behavior, con-sumer trends, price data, provider or source data, sales data, market trends, or other information usable to drive sales.

In one embodiment, the filter information 120 and profile information 130 are applied after the similarity analysis is performed as shown in FIGS. 5 and 6. After the recom-mended items are obtained, they are filtered using the filter information 120 and profile information 130 to obtain fil-tered complementary items 111. The filtered complementary items are presented to the customer 14. In another embodi-ment, the filter information 120 and profile information 130 are stored within embeddings, such as embedding informa-tion 26 and 36. The similarity analysis performed in con-nection with FIGS. 5 and 6 incorporates the filter and profile information 120 and 130 and yields filtered complementary items without requiring any further filtering.

Figure 13:
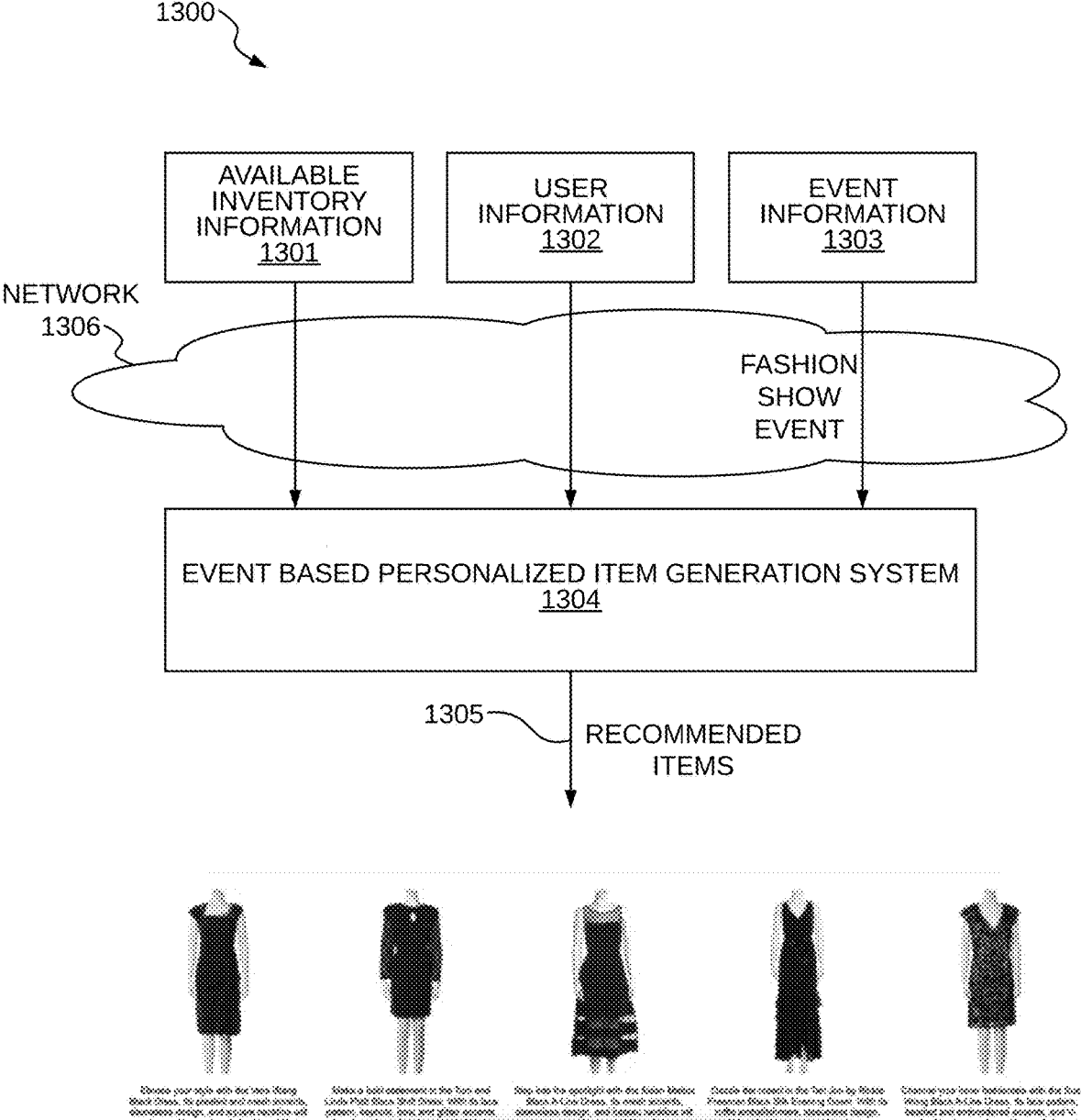
FIG. 13 is a diagram showing an embodiment of an event based personalized item generation system.

FIG. 13 is a diagram of an event based personalized item generation system 1304 in accordance with another embodi-ment. The system 1304 receives available inventory infor-mation 1301, user information 1302, and event information 1303 to generate personalized item recommendations 1305. The information can be obtained directly or through a network 1306. For example, in one embodiment, a user enters user information 1302 about an event the user would like to attend, such as a fashion show event. The user also specifies information such as event location, time of year, the user's clothing and shoe sizes, budget, and any other relevant user information. In one embodiment, the user's information is general in nature, such as any events within a city or state. In another embodiment, the user's informa-tion is more specific, such as a particular type of event, in a particular city, within a particular month during the year.

The system 1304 accesses the event information 1303 based on the user's input to determine one or more events that meet the user's preferences. The user may select one or multiple events from all the events that meet the user's criteria. Each event that is selected has associated event information, such as location, season of year, weather con-ditions, and any other relevant event information.

Using the information gathered about the event, the system 1304 accesses the available inventory 1301 to dis-cover items that are available that can be recommended to the user. In one embodiment, user information, such as user size, budget, purchase history, personal color preferences, and any other user information is used to discover available items that can be recommended to the user for the selected event(s). The available items may include clothing, shoes, hats, jewelry and any other personal items.

In one embodiment, the system 1304 ranks the discovered items and provides the top ranked items (e.g., top 5 items) to the user as recommended items 1305. For example, as illustrated in FIG. 13, a fashion show event has been selected, and based on information about the event, user, and available inventory, the system 1304 recommends the top 5 ranked dresses for the user to wear to the event. The total number of recommended items is selectable and the user can select one of the items and receive further outfit recommen-dations for the selected item as described above.

Figure 14:
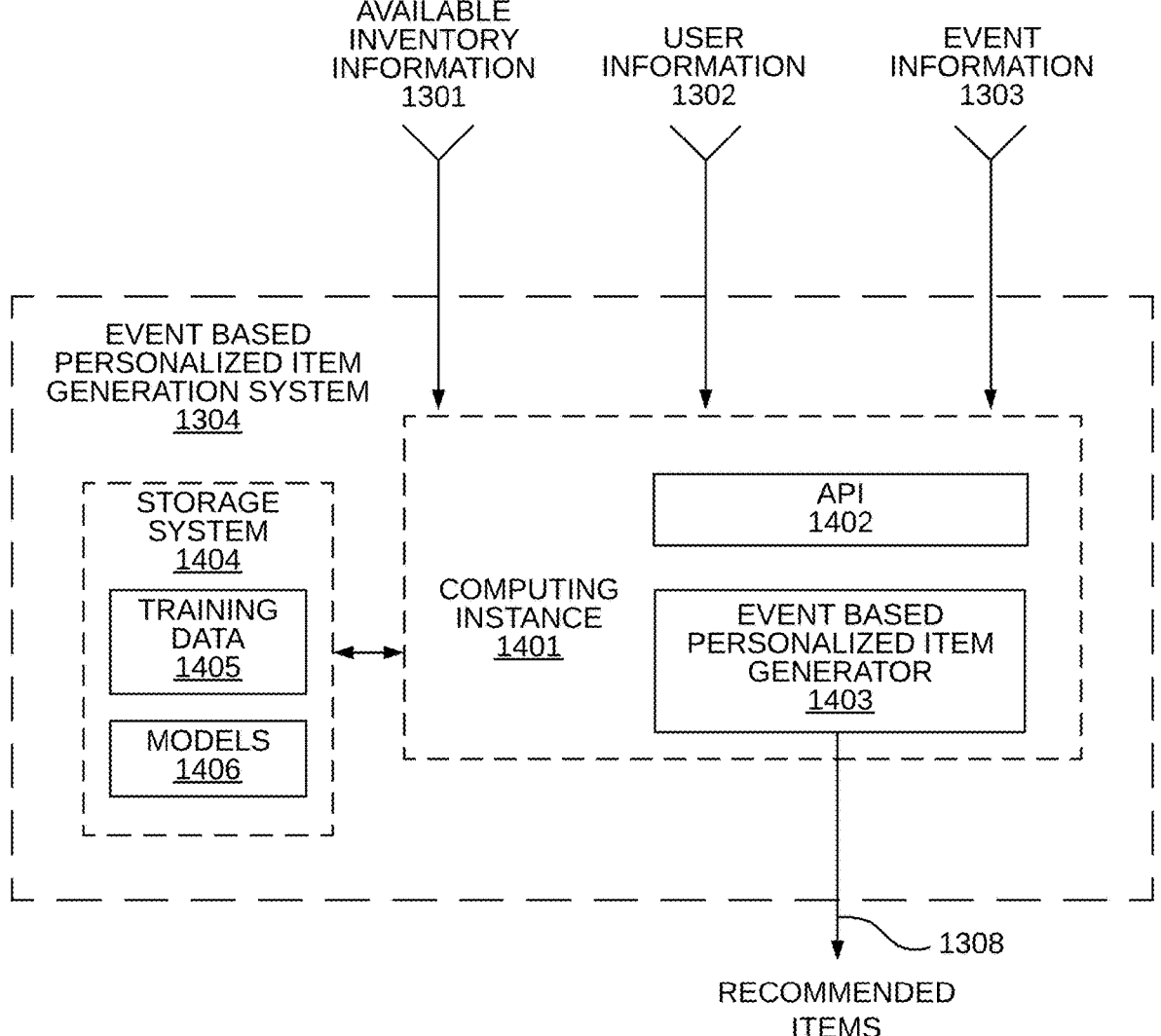
FIG. 14 is a detailed diagram of an event based personalized item generation system.

FIG. 14 is a detailed diagram of the event based personalized item generation system 1304. In one embodiment, the system 1304 comprises a computing instance 1401 and a storage system 1404. The computing instance 1401 includes an application program interface (API) 1402 and an event based personalized item generator 1403. The storage system 1404 includes training data 1405 and models 1406.

The generator 1403 utilizes a variety of embedding models 1406 that are trained using training data 1405. The models are used to generate embeddings of inventory 1301, user 1302, and event 1303 information that is received through the API 1402. The generator 1403 combines the embeddings to form a matched embedding that is used to determine available inventory items that match the user's event. Matching items that are discovered in inventory are ranked and then the top ranking items are provided as recommended items 1308.

Figure 15:
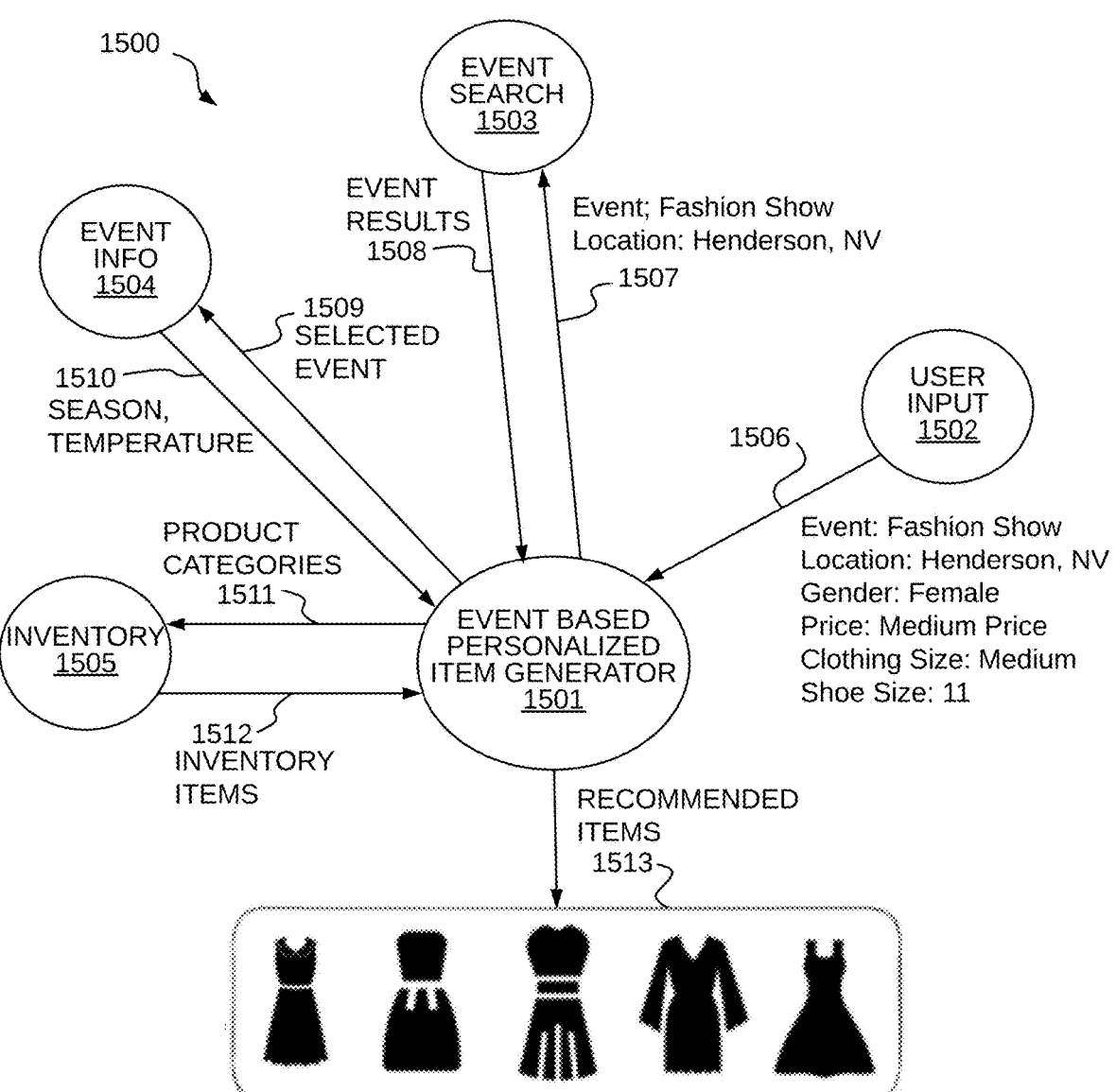
FIG. 15 is a functional diagram of an event based personalized item generation system.

FIG. 15 is a functional diagram 1500 of an event based personalized item generation system. In an embodiment, system 1500 includes an event based personalized item generator function 1501, user input function 1502, event search function 1503, event information function 1504, and item inventory function 1505.

During operation, the user function 1502 provides user information 1506 comprising one or more of an event, location, user gender, item price range, user clothing size, and user shoe size. The information 1506 provided by the user input function 1502 is not limited to the user information shown.

The event based personal item generator function 1501 receives the user information 1506 and provides some or all of the information 1507 to the event search function 1503. For example, in one embodiment, the type of event and location are provided to the event search function 1503 as indicated by path 1507. The search function 1508 generates search results 1508 based on the received inputs and provides the search results to the generator function 1501. The search result includes event results that meet the event type and location requirements.

Based on the event results, selected events are determined by the generator 1501. For example, the event results can be filtered based on user input to determine selected events of interest to the user.

The selected events 1509 are provided to the event information function 1504 which determines event information 1510 such as location, weather, season, and/or temperature at the location of the event, which are returned to the generator 1501.

Based on the event information 1510, the generator 1501 generates product categories 1511 that are processed by the inventory function 1505 to access the available inventory to obtain available inventory items 1512 in the desired product categories. The generator 1501 then ranks and selects the top ranked items as recommended items 1513 for presentation to the user.

Figure 16:
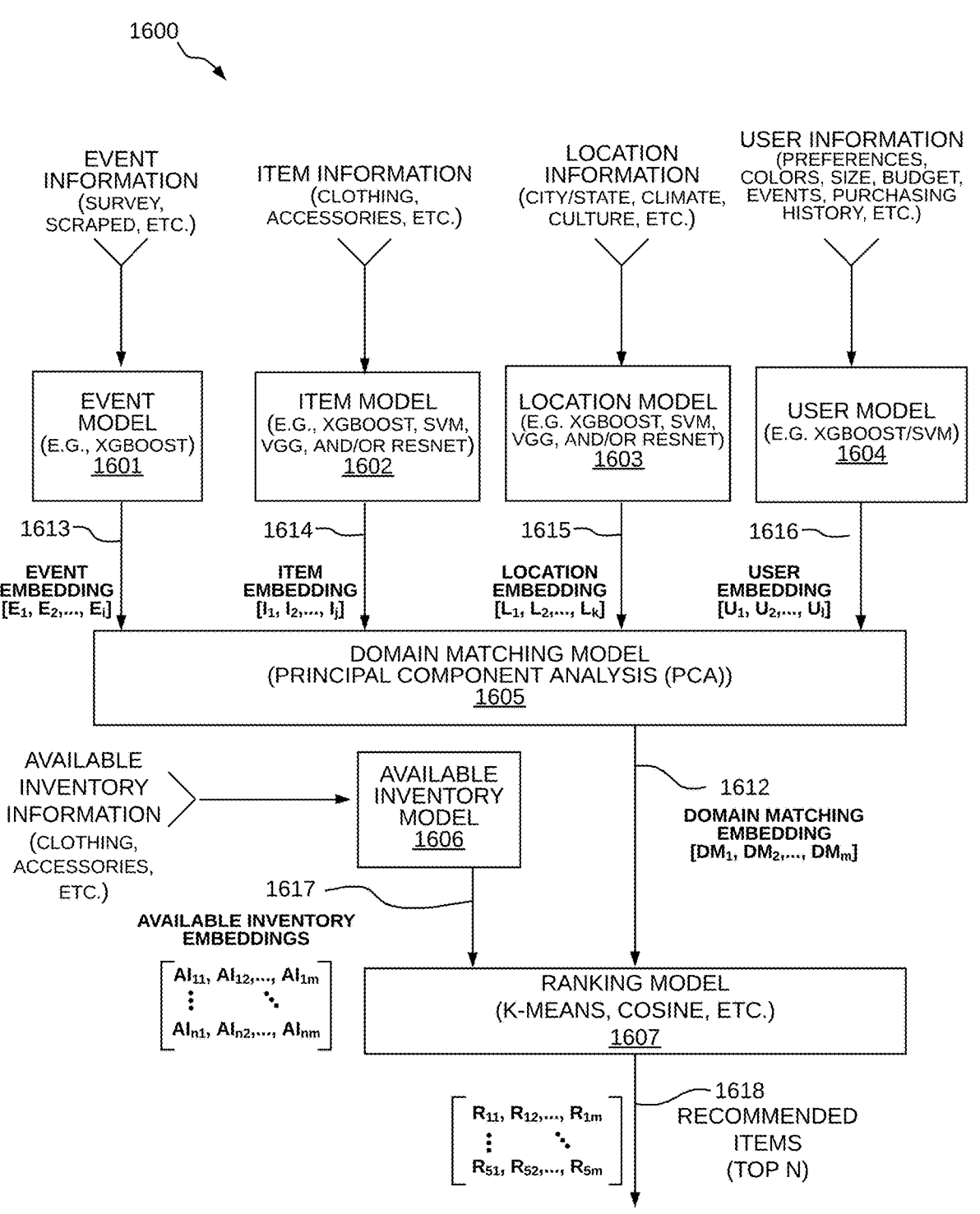
FIG. 16 is a system architecture of an event based personalized item generation system.

FIG. 16 is a system architecture 1600 of an event based personalized item generation system. The architecture 1600 comprises an event model 1601, item model 1602, location model 1603, and a user model 1604. The architecture 1600 also includes a domain matching model 1605, available inventor model 1606 and ranking model 1607.

During operation, the models receive a variety of information and generate associated embeddings. For example, the models implement one or more algorithms, such as XGBOOST, support vector learning machines (SVM), visual geometry group (VGG), and/or residual neural network (RESNET) to generate embeddings from received information.

The event model 1601 receives event information that is derived from surveys, scraped, or otherwise obtained. The event model 1601 processes the received information to generate an event embedding 1613 that represents the event information that is received.

The item model 1602 receives item information, such as types of clothing, accessories, shoes and other item information. The item model 1602 processes the received information to generate an item embedding 1613 that represents the item information that is received.

The location model 1603 receives location information of events, such as city, state, climate, culture, and other location information. The location model 1603 processes the received information to generate a location embedding 1615 that represents the location information that is received.

The user model 1604 receives user information, such as preferences, colors, size, budget, preferred events, purchase history and other user information. The user model 1604 processes the received information to generate a user embedding 1616 that represents the user information that is received.

The domain matching model 1605 receives the embeddings from the event, item, location, and user models. The domain matching model 1605 processes the received embeddings to generate a domain matching embedding 1616 that represents the information that is received in the various embeddings. For example, in one embodiment, the domain matching model 1605 implements a principal component analysis (PCA) algorithm to (1) standardize the range of continuous initial variables, (2) compute the covariance matrix to identify correlations, (3) compute the eigenvectors and eigenvalues of the covariance matrix to identify the principal components, (4) create a feature vector to decide which principal components to keep, and (5) recast the data along the principal components axes.

The available inventory model 1606 receives information about available inventory, such as available clothing, shoes, hats, jewelry, and other inventor items. The available inventory model 1606 processes the received inventory information to generate an available inventory embedding 1617 that represents the inventory information that is received.

The ranking model 1607 receives the available inventory embedding 1617 and the domain matching embedding 1612 and processes the received embeddings to rank the available inventory items according to how well they match with the desired event, item, location, and user preferences. For example, in various embodiments, the ranking model 1607 implements k-means clustering, cosine similarity, or other algorithms to perform the ranking operations. The ranking model 1607 identifies the embeddings of the available inventory embeddings 1617 that are most similar to the domain matching embeddings 1612. Once the ranking is complete, the ranking model 1607 outputs the top "N" items as recommended items 1618. The number of items "N" is adjustable by the user. In the example of FIG. 16, "N=5" and the ranking model outputs the top five (5) most similar items.

FIG. 17 is an alternative embodiment of an event based personalized item generation system 1700. In one embodiment the generation system 1700 comprises a user interface 1701, a network interface 1709, and four embedding generators shown at 1710. The system 1700 also comprises an inventory embedding generator 1707, a domain matching embedding generator 1706, and a ranking processor 1708.

In one embodiment the user interface 1701 receives user input that identifies events that the user is interested in attending. The user desires to have recommendations for items in an item inventory that would be suitable to wear when attending the event. The network interface 1709 interfaces to external Networks to obtain information about events of interest to the user. The information that is obtained is passed through a bus to the embedding generators the 1710 as needed.

The embedding generators 1710 operate to obtain event, user, location and item information from both the user and the network interface, and process this information to generate associated embeddings. The embeddings generated by the embedding generators 1710 are input to the domain matching generator 1706.

The domain matching embedding generator 1706 operates to generate an embedding from all the embeddings it receives. The generated domain matching embedding 1711 is input to the rank processor 1708.

The inventory embedding generator 1707 receives inventory information and generates an inventory embedding 1712 that is input to the rank processor 1708.

The rank processor 1708 receives the inventory embedding 1712 and the domain matching embedding 1711 and processes these embeddings to determine available inventory items in inventory that match with the events identified by the user. The rank processor 1708 also ranks the matching items and provides the highest ranking items (or the N top ranking items) to the user as recommended items 1713.

FIG. 18 is a flow graph of a method 1800 for personalized item generation. In one embodiment, method 1800 is performed by the personalized item generation systems shown in FIGS. 13-17.

At step 1801, user and event information is obtained. For example, in one embodiment, the user information is obtained by the user interface 1701 and the event information is obtained from a network using the network interface 1709. The user information includes but is not limited to items, budget, locations, clothing preferences, and event types. The event information includes but is not limited to locations, event types, culture, weather, and season.

At step 1802, embeddings for one or more of events, items, locations, and/or user information are generated. For example, in one embodiment, embedding generators 1710 generate the embeddings.

At step 1803, a domain matching embedding is generated. In one embodiment, the domain matching embedding generator 1706 combines multiple embeddings it receives to form the domain matching embedding 1711.

At step 1804, an inventory embedding is generated. In one embodiment, the inventory embedding generator 1707 generates the inventor embedding 1712.

At step 1805, available items in an inventory are identified based on the inventory embedding and the domain matching embedding. In one embodiment, the ranking processor 1708 uses the domain matching embedding 1711 to identify matching items in the inventory embedding 1712.

At step 1806, the identified items in the inventory are ranked. In one embodiment, the ranking processor 1708 ranks the identified items.

At step 1807, selected ranked items are provided to the user. In one embodiment, the ranking processor 1708 outputs the top ranked items to a user. In one embodiment, the top five ranked items are output.

Thus, method 1800 operates to provide personalized item generation in accordance with the invention. It should be noted that the operations of method 1800 are exemplary and not limiting and that the operations can be rearranged, added to, deleted, and/or otherwise modified within the scope of the embodiments.

Figure 19:
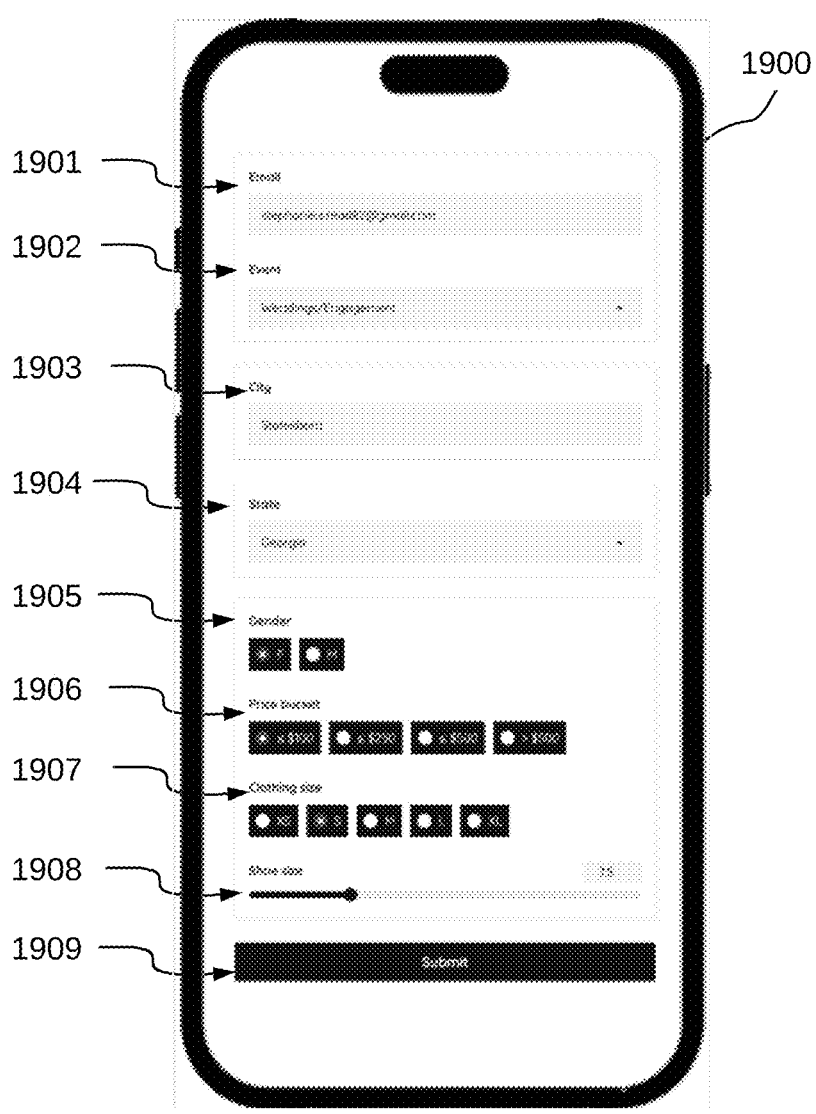

FIG. 19 is a screenshot of a user interface 1900 suitable for use with the event based personalized item generation system. The user interface screen 1900 provides a variety of entry regions in which the user can enter information. In one embodiment, the entry regions comprise an email input region 1901, an event input region 1902, a city input region 1903, a state input region 1904, a gender input selector 1905, a price input selector 1906, a clothing size input selector 1907, a shoe size input selector 1908, and a submission button 1909.

FIG. 20 is a detailed screenshot of an event selector drop-down menu. For example, when a user enters an event in the user interface, the event selection drop-down menu 2001 appears. The menu 2001 allows the user to select from a variety of events including a "surprise me" selection.

FIG. 21 is a detailed screenshot of an event description menu. For example, when a user enters an event in the user interface, the event description 2101 provides a detailed description of a matching event.

Figure 22:
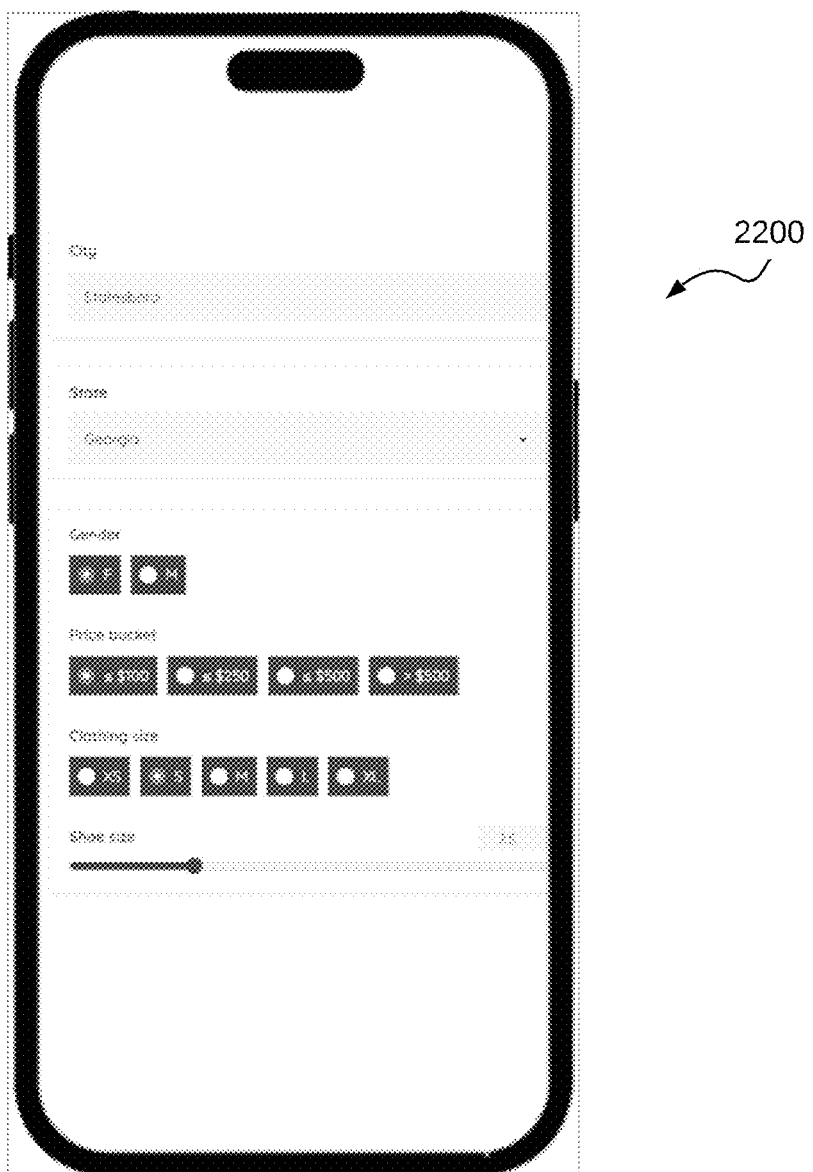

FIG. 22 is a screenshot of an abbreviated user interface 2200 suitable for use with the event based personalized item generation system. The abbreviated user interface screen 2200 provides a variety of entry regions in which the user can enter information.

Figure 23:

FIG. 23 is a screenshot of an exemplary output recommendation page that shows the event 2300 and the recommended items 2301 for the event.

Figure 24:

FIG. 24 is a screenshot of another exemplary output recommendation page that shows the event 2400 and the recommended items 2401 for the event.

Figure 25:
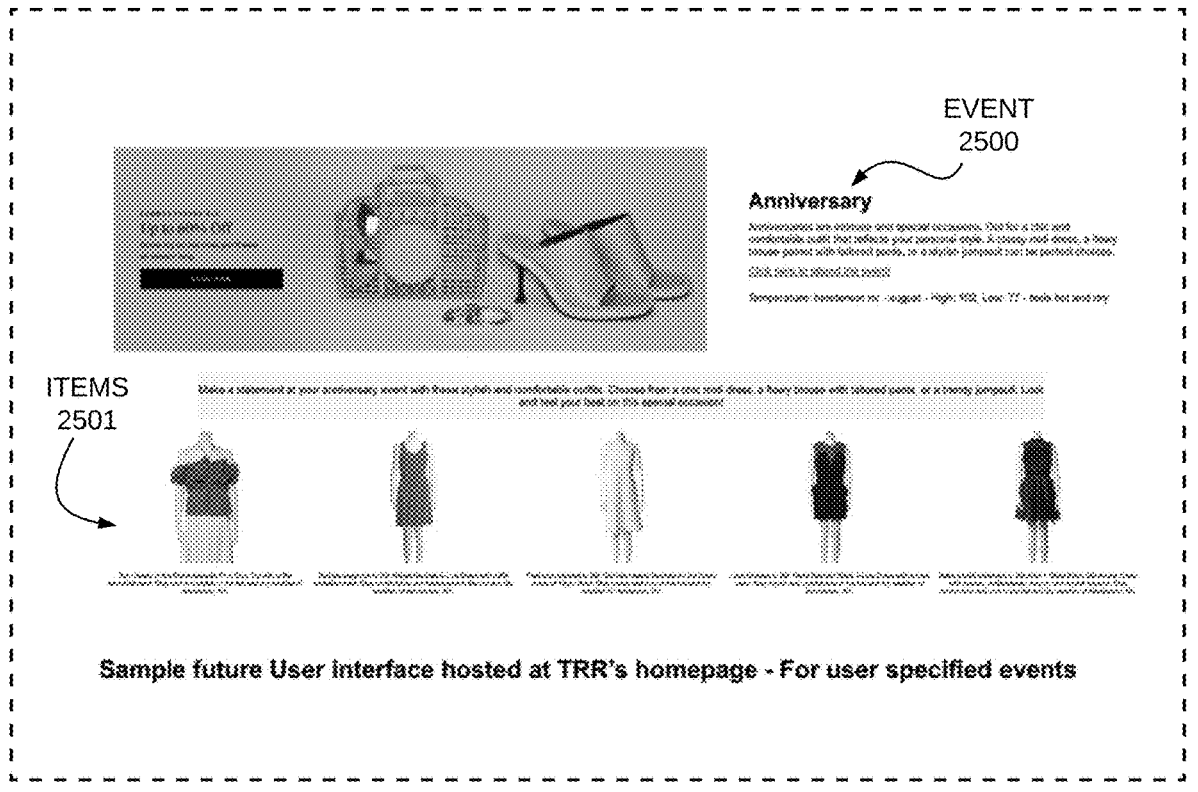

FIG. 25 is a screenshot of another exemplary output recommendation page that shows the event 2500 and the recommended items 2501 for the event.

Figure 26:
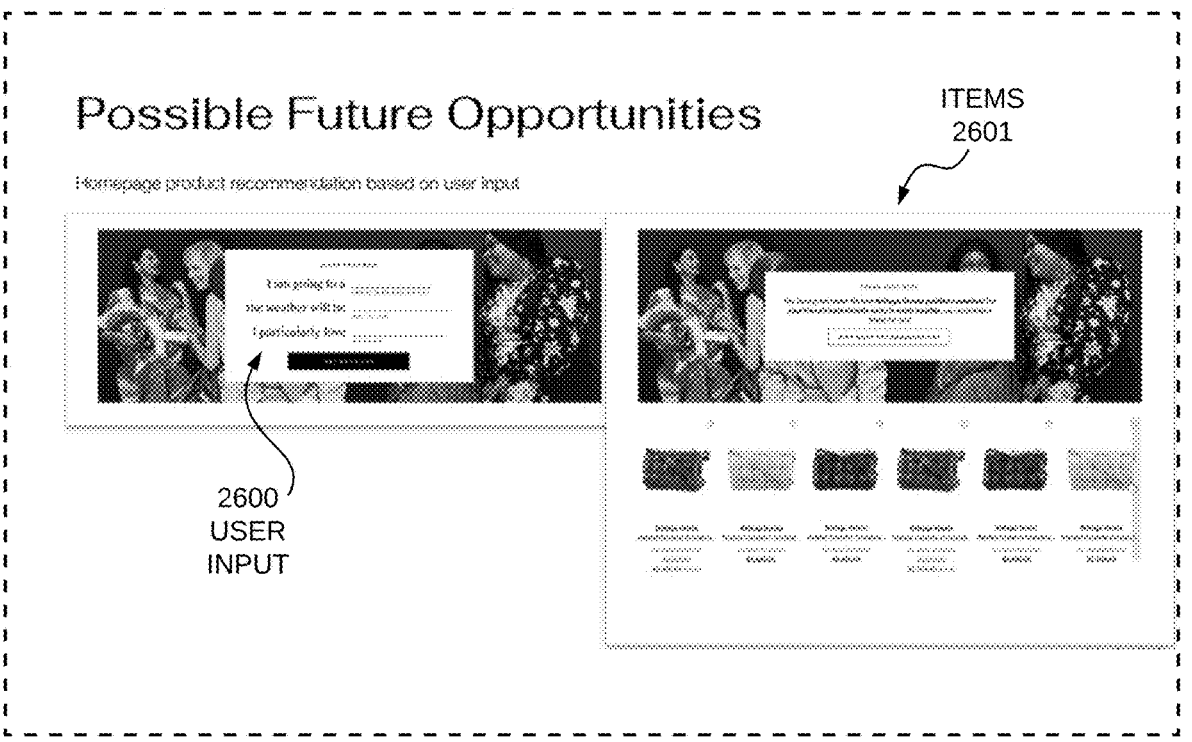

FIG. 26 is a screenshot of an alternative output recommendation page that shows a user input dialogue box 2600 and resulting recommended items 2601 for the event.

Figure 27:
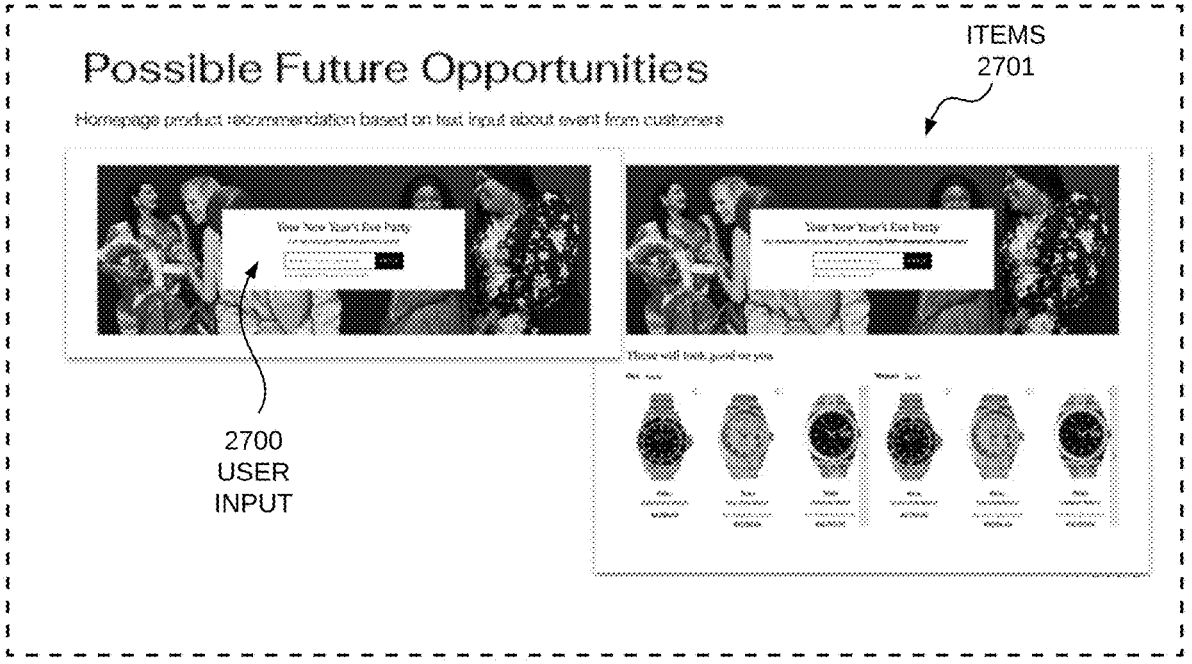

FIG. 27 is a screenshot of an alternative output recommendation page that shows a user input dialogue box 2700 and resulting recommended items 2701 for the event.

Figure 28:
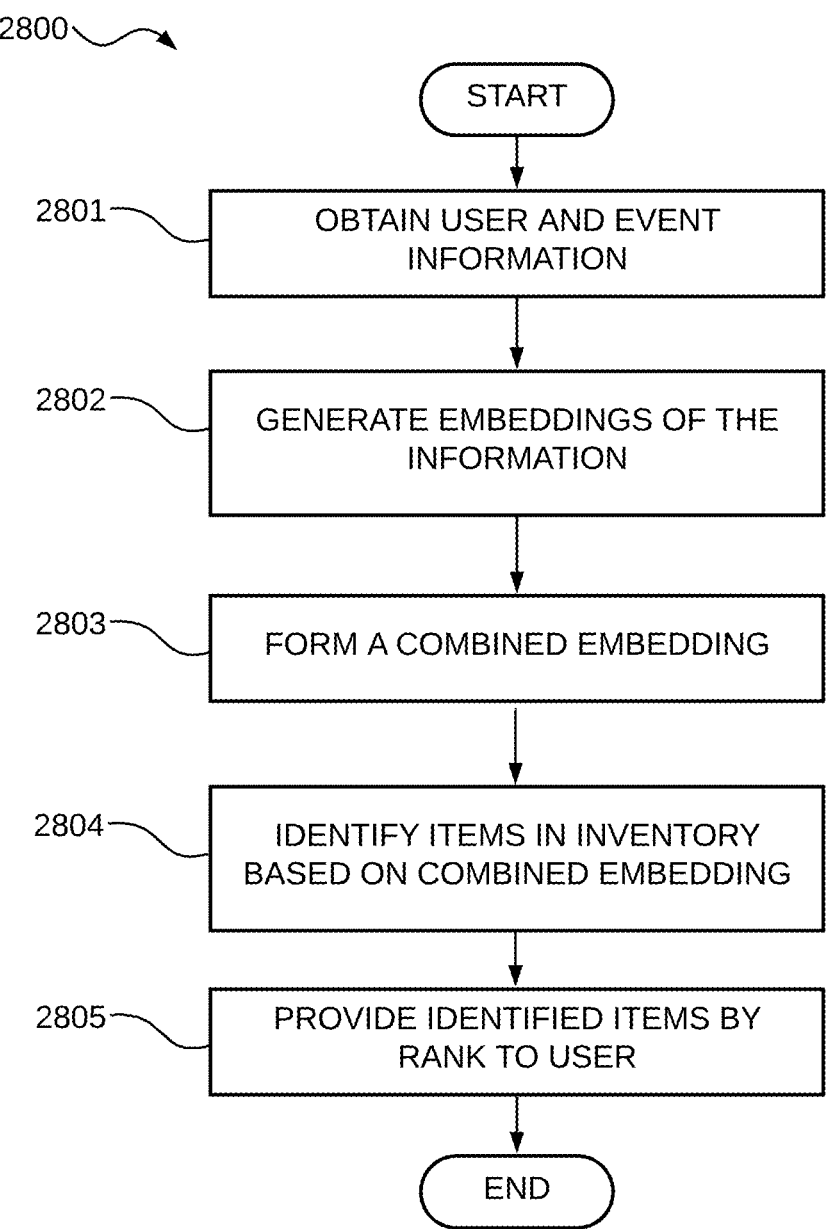
FIG. 28 is a flow graph of a method for personalized item generation.

FIG. 28 is a flow graph of a method 2800 for personalized item generation. In one embodiment, method 2800 is performed by the personalized item generation systems shown in FIGS. 13-17.

At step 2801, user and event information is obtained. For example, in one embodiment, the computing instance 1401 obtains user information 1302 and event information 1303.

At step 2802, embeddings of the information are generated. For example, in one embodiment, the generator 1403 uses the models 1406 to generate embeddings of the user and event information.

At step 2803, a combined embedding is generated. For example, in one embodiment, the domain matching model 1605 generates the combined embedding from the embeddings generated at step 2802.

At step 2804, items in an inventory are identified based on the combined embedding. For example, in one embodiment, the ranking model 1607 identifies items in an inventory based on the combined embedding 1612.

At step 2805, the identified items are provided to a user in ranked order. For example, in one embodiment, the ranking model 1607 outputs identified items in ranked order 1618.

Thus, method 2800 operates to provide personalized item generation in accordance with the invention. It should be noted that the operations of method 2800 are exemplary and not limiting and that the operations can be rearranged, added to, deleted, and/or otherwise modified within the scope of the embodiments.

Although certain specific embodiments are described above for instructional purposes, the teachings of this patent document have general applicability and are not limited to the specific embodiments described above. The outfit recommender 17, the storage system 18, and the event based personalized item generation system 1304 are implemented using Google Cloud Platform (GCP), Amazon® Web Services (AWS), or Microsoft Azure cloud services, but it is appreciated that the outfit recommender 17, the storage system 18, and the event based personalized item generation system 1304 may be implemented in many other ways using other platforms or techniques. Accordingly, various modifications, adaptations, and combinations of various features of the described embodiments can be practiced without departing from the scope of the invention as set forth in the claims.

What is claimed is:

1. A method comprising:
obtaining event information;
obtaining user information associated with a user;
obtaining available inventory information;
generating one or more items based on the event information, the user information, and the available inventory information; and
presenting the one or more items to the user, wherein generating the one or more items includes using:
an event model configured to generate an event embedding from the event information;
a user model configured to generate a user embedding from the user information;
an inventory model configured to generate available inventory embeddings from the available inventory information; and
a domain matching model configured to generate a domain matching embedding from the event embedding and the user embedding, wherein the domain matching embedding has an equivalent dimension as the available inventory embeddings, and to identify the one or more items by:
analyzing the domain matching embedding and a plurality of the available inventory embeddings to compute cosine similarity values between the domain matching embedding and each available inventory embedding of the plurality of the available inventory embeddings;
in response to detecting the cosine similarity values, ranking the plurality of the available inventory embeddings based on the cosine similarity values; and
in response to detecting a highest-ranked set of the available inventory embeddings, selecting, as the one or more items, a top N set of available inventory items corresponding to highest-ranked available inventory embeddings.

2. The method of claim 1, wherein event information includes one or more items selected from the group consisting of: event type information of an event, location information of the event, event setting information, climate information, culture information of a geographic area surrounding the event, and event-related information.

3. The method of claim 1, wherein event information is obtained from at least one of large language models (LLMs), generative artificial intelligence (AI) models, stored data, a data scraping system, or user input data.

4. The method of claim 1, wherein the generating of the one or more items based on the event information, the user information, and the available inventory information comprises:
using an event model configured to generate an event embedding from the event information;
using a user model configured to generate a user embedding from the user information;
using a domain matching model configured to generate a domain matching embedding from the event embedding and the user embedding;
using an inventory model configured to generate available inventory embeddings from the available inventory information; and
generating the one or more items using the available inventory embeddings and the domain matching embedding.

5. The method of claim 4, wherein each of the event embedding, the user embedding, and the available inventory embeddings need not have an equivalent dimension, and wherein the domain matching embedding has an equivalent dimension as the available inventory embeddings.

6. The method of claim 4, wherein the generating of the one or more items based on the event information, the user information, and the available inventory information further comprises:
generating a location embedding from the location information;
generating an item embedding from the item information, and wherein the domain matching embedding is generated from the event embedding, the user embedding, the location embedding, and the item embedding.

7. The method of claim 4, wherein the generating the one or more items using the available inventory embeddings and the domain matching embedding involves ranking the available inventory embeddings most similar to the domain matching embedding.

8. The method of claim 1, wherein the user information indicates buying preferences of the user and includes at least one item selected from the group consisting of: a price range preference, designer or item source preference, taxon preference, color preference, sizing information, gender information, and historical purchasing information.

9. The method of claim 1, wherein the available inventory indicates inventory available for purchase from a single SKU (stock keeping unit) provider entity.

10. A system comprising:
a storage system; and
an event based item generator configured to (i) obtain event information, user information associated with a user, and available inventory information, and (ii) generate one or more items based on the event information, the user information, and the available inventory information, wherein to generate the one or more items, the event based item generator comprises:
an event model configured to generate an event embedding from the event information;
a user model configured to generate a user embedding from the user information;
an inventory model configured to generate available inventory embeddings from the available inventory information; and
a domain matching model configured to generate a domain matching embedding from the event embedding and the user embedding, wherein the domain matching embedding has the same dimension as the available inventory embeddings, and to identify the one or more items by:

analyzing the domain matching embedding and a plurality of the available inventory embeddings to compute cosine similarity values between the domain matching embedding and each available inventory embedding of the plurality of the available inventory embeddings;

in response to detecting the cosine similarity values, ranking the plurality of the available inventory embeddings based on the cosine similarity values; and in response to detecting a highest-ranked set of the available inventory embeddings, selecting, as the one or more items, a top N set of available inventory items corresponding to highest-ranked available inventory embeddings.

11. The system of claim 10, wherein the event based item generator is also configured to (iii) present the one or more items to the user.

12. The system of claim 10, wherein event information includes one or more items selected from a group consisting of: event type information of an event, location information of the event, event setting information, climate information, culture information of a geographic area surrounding the event, and event-related information.

13. The system of claim 10, wherein the user information indicates buying preferences of the user and includes at least one item selected from the group consisting of: a price range preference, designer or item source preference, taxon preference, color preference, sizing information, gender information, and historical purchasing information.

14. The system of claim 10, wherein the one or more items are provided by a single SKU (stock keeping unit) provider.

15. The system of claim 10, wherein in generating the one or more items based on the event information, the user information, and the available inventory information, the event based item generator is further configured to:

generating an event embedding from the event information;

generating a user embedding from the user information;

generating a domain matching embedding from the event embedding and the user embedding;

generating available inventory embeddings from the available inventory information; and generating the one or more items using the available inventory embeddings and the domain matching embedding, wherein the event based item generator comprises an event model configured to generate the event embedding, a user model configured to generate the user embedding, an inventory model configured to generate the available inventory embeddings, and a domain matching model configured to generate the domain matching embedding and to identify the one or more items by:

analyzing the domain matching embedding and a plurality of the available inventory embeddings to compute cosine similarity values between the domain matching embedding and each available inventory embedding of the plurality of the available inventory embeddings;

in response to detecting the cosine similarity values, ranking the plurality of the available inventory embeddings based on the cosine similarity values; and in response to detecting a highest-ranked set of the available inventory embeddings, selecting, as the one or more items, a top N set of available inventory items corresponding to highest-ranked available inventory embeddings.

16. The system of claim 15, wherein in generating the one or more items based on the event information, the user information, and the available inventory information, the event based item generator is further configured to:

generate a location embedding from the location information;

generate an item embedding from the item information, and wherein the domain matching embedding is generated from the event embedding, the user embedding, the location embedding, and the item embedding.

17. The system of claim 15, wherein in generating the one or more items based on the event information, the user information, and the available inventory information, the event based item generator ranks the available inventory embeddings most similar to the domain matching embedding.

18. The system of claim 10, wherein the event based item generator comprises a computing instance provided on a cloud computing platform.

19. An event based item generator comprising:

a storage system; and means for obtaining event information, user information associated with a user, and available inventory information, wherein the means is also for generating one or more items based on the event information, the user information, and the available inventory information, wherein the means identifies the one or more items by:

analyzing a domain matching embedding and a plurality of available inventory embeddings to compute cosine similarity values;

in response to detecting the cosine similarity values, ranking the plurality of available inventory embeddings based on the cosine similarity values; and in response to detecting a highest-ranked set of available inventory embeddings, selecting a top N set of available inventory items corresponding to highest-ranked available inventory embeddings.

20. The event based item generator of claim 19, wherein the means is a computing instance operating on a cloud computing platform.

* * * * *